(12) United States Patent
Carlsson et al.

(10) Patent No.: US 12,187,154 B2
(45) Date of Patent: Jan. 7, 2025

(54) CHARGE CABLE RELEASE FOR AN ELECTRIC VEHICLE

(71) Applicant: Volvo Car Corporation, Gothenburg (SE)

(72) Inventors: Per Carlsson, Sävedalen (SE); Jerry Haaga, Lödöse (SE)

(73) Assignee: Volvo Car Corporation, Gothenburg (SE)

( * ) Notice: Subject to any disclaimer, the term of this patent is extended or adjusted under 35 U.S.C. 154(b) by 200 days.

(21) Appl. No.: 17/821,307

(22) Filed: Aug. 22, 2022

(65) Prior Publication Data

US 2024/0059176 A1    Feb. 22, 2024

(51) Int. Cl.
*B60L 53/68* (2019.01)
*B60L 53/14* (2019.01)
*G08C 17/02* (2006.01)
*H02J 7/00* (2006.01)

(52) U.S. Cl.
CPC .............. *B60L 53/68* (2019.02); *B60L 53/14* (2019.02); *G08C 17/02* (2013.01); *H02J 7/007188* (2020.01)

(58) Field of Classification Search
CPC ......... B60L 53/68; B60L 53/14; G08C 17/02; H02J 7/007188; H02J 7/00034
See application file for complete search history.

(56) References Cited

U.S. PATENT DOCUMENTS

| | | | | |
|---|---|---|---|---|
| 9,446,682 | B2* | 9/2016 | Gauthier | G01C 21/343 |
| 2009/0085522 | A1* | 4/2009 | Matsumoto | B60L 53/60 |
| | | | | 320/137 |
| 2013/0110296 | A1* | 5/2013 | Khoo | B60L 53/14 |
| | | | | 700/286 |
| 2013/0338820 | A1* | 12/2013 | Corbett | B60L 53/14 |
| | | | | 320/109 |
| 2016/0075249 | A1* | 3/2016 | Grabar | B60L 53/65 |
| | | | | 320/108 |
| 2017/0043675 | A1* | 2/2017 | Jones | H02J 50/402 |
| 2018/0215280 | A1* | 8/2018 | Lee | B60R 25/23 |
| 2020/0353831 | A1* | 11/2020 | Corey | G06Q 30/0208 |
| 2023/0241998 | A1* | 8/2023 | Ahtikari | B60L 53/68 |
| | | | | 320/109 |
| 2024/0025275 | A1* | 1/2024 | Kemal | B60L 53/18 |
| 2024/0034274 | A1* | 2/2024 | Godet | G01S 13/74 |

FOREIGN PATENT DOCUMENTS

JP        2013135549 A    *  7/2013

* cited by examiner

*Primary Examiner* — Adnan Aziz
(74) *Attorney, Agent, or Firm* — Amin, Turocy & Watson, LLP

(57) ABSTRACT

Techniques are described for controlling charging of an electric vehicle. According to one or more embodiments, a system is provided comprising a memory that stores computer executable components and a processor that executes the computer executable components stored in the memory, wherein the computer executable components comprise a signaling component located on an electric vehicle and configured to detect a presence of a portable device and a charge control component configured to, upon detection of the presence of the portable device, terminate charging of the electric vehicle.

20 Claims, 11 Drawing Sheets

CHARGE CABLE RELEASE FOR AN ELECTRIC VEHICLE

TECHNICAL FIELD

This application relates to techniques facilitating controlling charging of a battery located on an electric vehicle based upon determining location of a portable device proximate to the vehicle.

BACKGROUND

Electric vehicles are powered by an electric motor that draws energy from an onboard battery. The battery can be recharged at any time, e.g., during a journey, while parked for a duration of time (e.g., overnight). The charging operation typically entails connection of the electric vehicle to a charging station via a charging cable plugged into a charging port on the vehicle.

Current charging operations can be complicated and/or confusing to an operator of the vehicle with regard to, for example, terminating the charging operation. Termination can be by means of pressing a 'cease charging' button located at the charging port or inside the electric vehicle (e.g., a mechanical button requiring applied pressure to operate, a button located on a touch display (e.g., a human machine interface (HMI)) located on the dashboard of the electric vehicle), and the like. A simpler, less-confusing operation for controlling termination of the charging operation would be beneficial in the marketplace. The marketplace can further benefit from a cheaper, less technically complex operation for controlling the charging operation.

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, devices, computer-implemented methods, methods, apparatus and/or computer program products are presented that facilitate controlling a charging operation of an electric vehicle.

According to one or more embodiments, a system is provided that can determine whether charging of a battery located on an electric vehicle is to be maintained or terminated. The system can comprise a memory that stores computer executable components and a processor that executes the computer executable components stored in the memory. The computer executable components can comprise a signaling component located on an electric vehicle and configured to detect presence of a portable device. The computer executable components can further comprise a charge control component configured to, upon detection of the presence of the portable device, terminate charging of the electric vehicle.

In a further embodiment, the computer executable components can further comprise a transceiver communicatively coupled to the signaling component, wherein the transceiver can be configured to receive one or more signals transmitted from the portable device. In an embodiment, the one or more signals received from the portable device are transmitted at ultra-wideband frequency between the portable device and the electric vehicle. In another embodiment, the portable device can be one of a smartphone, a smartwatch, a computer, a cellphone, a keyfob, a tablet computer, a laptop computer, etc.

In yet a further embodiment, the computer executable components can further comprise a location component configured to determine location of the portable device based upon the one or more signals received at the transceiver, wherein the location component can compare first data included in a first signal received by the signaling component and second data included in a second signal received by the signaling component with a plurality of configurations respectively configured to terminate charging of the electric vehicle, maintain charging of the electric vehicle, initiate charging of the electric vehicle, or unlock/release a charging cable supplying energy to the EV to facilitate removal of the charging cable plug from a charging port on the electric vehicle, etc. In an embodiment, the first data and second data can comprise at least one of position data or motion data. It is to be appreciated that while various embodiments presented herein relate to unlocking of a charging cable at the EV, the processes presented can also be utilized to enable locking of the charging cable to the EV.

In an embodiment, the location component can be further configured, in the event of the first data and second data being comparable to a configuration to terminate charging of the electric vehicle, to transmit a signal to the charge control component to terminate charging of the electric vehicle.

In another embodiment, the location component can be further configured, in the event of the first data and second data not being comparable to a configuration to terminate charging of the electric vehicle, to transmit a signal to the charge control component to maintain charging of the electric vehicle.

In other embodiments, elements described in connection with the disclosed systems can be embodied in different forms such as computer-implemented methods, computer program products, or other forms. For example, in an embodiment, a computer-implemented method can be utilized for controlling charging of an electric vehicle, wherein the method comprises detecting at least one of movement or location of a portable device proximate to the electric vehicle, and terminating charging of a battery located on the electric vehicle based upon the movement or location of the portable device.

In a further embodiment, the computer-implemented method can further comprise receiving a first signal and a second signal from the portable device and establishing a pattern of movement or location of the portable device by comparing first data in the first signal with second data in the second signal. In another embodiment, the computer-implemented method can further comprise determining charging of the electric vehicle is to be terminated based upon the pattern of movement or location of the portable device. In an embodiment, the determination of the pattern of movement or location can further comprise comparing the pattern with a plurality of pre-configured patterns. In an embodiment, the computer-implemented method can further comprise adjustment of at least one pattern in the plurality of pre-configured patterns based upon local operating conditions. In another embodiment, the computer-implemented method can comprise the first signal and second signal are transmitted at ultra-wideband frequency. In another embodiment, the portable device can be one of a smartphone, a smartwatch, a computer, a cellphone, a keyfob, a tablet computer, a laptop computer, etc. In a further embodiment, the portable device is configured to transmit signals using ultra-wideband frequency.

In another embodiment, a computer program product can comprise a computer readable storage medium having program instructions embodied therewith, the program instructions can be executable by a processor, causing the processor to terminate charging of an electric vehicle based upon on the movement or location of a portable device relative to a location of the electric vehicle.

In a further embodiment, the program instructions can be further executable by the processor to cause the processor to determine the movement or location of the portable device based upon a plurality of signals received from the portable device. In another embodiment, the program instructions can be further executable by the processor to cause the processor to determine, based upon the movement or location of the portable device, charging of the electric vehicle is to be maintained. In an embodiment, the plurality of signals received from the portable device are ultra-wideband frequency. In another embodiment, the portable device can be one of a smartphone, a smartwatch, a computer, a cellphone, a keyfob, a tablet computer, a laptop computer, etc.

An advantage of the one or more systems, computer-implemented methods and/or computer program products can be controlling charging of a battery located on an electric vehicle based upon the motion and/or position of a portable device. Accordingly, in an embodiment, an operator of the portable device can control the charging operation by simply standing still by the electric vehicle for a few moments, to cause the charging operation to cease. Per the various embodiments presented herein, controlling the charging operation can be a less complicated and/or confusing operation than is commonplace today, as well as being cheaper and technically simpler.

DESCRIPTION OF THE DRAWINGS

One or more embodiments are described below in the Detailed Description section with reference to the following drawings.

DETAILED DESCRIPTION

Figure 1:
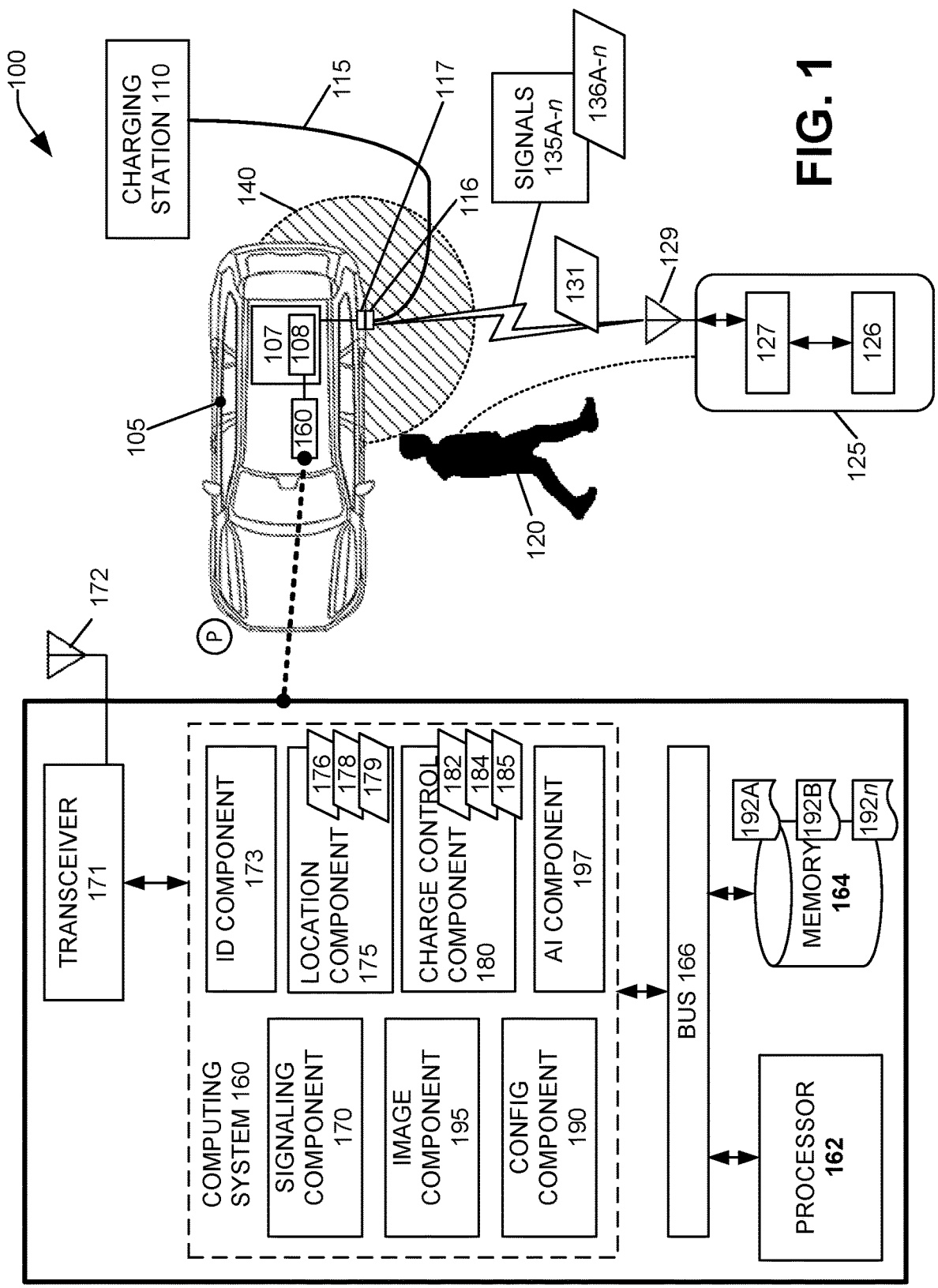
FIG. 1 is a block diagram representation of example components related to controlling charging of an electric vehicle based upon position and/or location of a portable device, in accordance with various aspects and implementations of the subject disclosure.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting. As used herein, "data" can comprise metadata. Further, ranges A-n are utilized herein to indicate a respective plurality of devices, components, signals etc., where n is any positive integer. Furthermore, x herein indicates any value greater than zero.

While one or more devices and/or systems are described below with reference to an electric vehicle, such as an automobile, the one or more embodiments described herein are not limited to this use. For example, one or more embodiments presented herein can be utilized to control charging of any battery, wherein the battery may be located on a military vehicle, a marine vehicle such as a boat, ship, or marine drone, a winged vehicle such as a plane or drone, and/or a rotor-ed vehicle such as a helicopter or drone. Likewise, one or more embodiments presented herein can be extended to controlling charging of a battery located on a robot and/or any suitable moving or stationary device. Further, one or more embodiments presented herein can be utilized to control charging of a battery, wherein the battery is a standalone device, e.g., the battery is not located on a vehicle, device, etc.

It is to be appreciated that while the various embodiments presented herein are directed to an electric vehicle, the embodiments can be applied to any vehicle utilizing a battery charging system, e.g., a Battery Electric Vehicle (BEV) where the powerplant is only an electric motor powered by a battery, a Plug-in Hybrid Electric Vehicle (PHEV) having both a gasoline/petrol engine & fuel tank and an electric motor powered by a battery, and the like.

In an embodiment, the disclosed subject matter can be directed to controlling charging of an electric vehicle based upon detecting proximity of a portable device to the electric vehicle while, for example, the battery charging operation is underway. In another embodiment, an operator of the vehicle (e.g., owner, driver) can be carrying/conveying a portable device which includes a radio signal transmitter, wherein the portable device can be any of a keyfob (also known as a smartkey), a smartphone, a smartwatch, a laptop, etc. The transmitter can be utilizing any radio signaling technology suitable to enable accurate determination of position and/or motion of the portable device. In an embodiment, the radio signaling technology can be ultra-wideband (UWB) frequency/technology. In an example of use, if the operator wants to terminate charging of the battery, they can approach and stand by the vehicle's charging port, and while doing so, the portable device, is transmitting the radio signals (e.g., UWB signals).

In an embodiment, a computer system located on the vehicle can detect the signals being transmitted from the portable device and further determine (based on one or more configurations/patterns) that the charging operation is to terminate/cease. For example, upon detecting that a series of signals transmitted from the portable device fit a configuration (e.g., the operator is located at a particular distance from the vehicle and the portable device is being held stationary) a signal can be sent by the on-board computer system to terminate charging of the battery. If the operator is simply walking by the vehicle (e.g., walking through their garage) the system can determine that the motion and/or location of the portable device is not one associated with terminating the charge operation and charging of the battery can be maintained.

In another embodiment, the operator can also make a waving motion while holding the portable device, that motion can be detected and is associated (e.g., in a configuration) with ceasing the charging operation.

The one or more configurations can be edited based upon the local operating conditions, thereby reducing a number of instances that could lead to erroneous control of the battery charging operation. For example, vehicle is parked in a home garage by a door connecting a garden to the kitchen, a configuration(s) can be edited to ignore signals from that region of the garage as it is a frequently used route and by ignoring that region, the number of erroneously initiated charge-terminate signals is reduced.

The various embodiments presented herein are advantageous over current battery charging operations as once configured, an operator of a vehicle (while carrying the portable device) only has to be in proximity of the vehicle to terminate battery charging, with a computer system onboard the vehicle detecting the portable device and controls the battery charging operation without interaction from the vehicle operator. It is to be noted, that while various embodiments presented herein depict a vehicle is currently being charged with charging being terminated based upon detection of the portable device, other operating scenarios are equally applicable to the various embodiments presented herein. For example, a vehicle is connected to a charging station, but no charging is currently occurring. Based upon detection of the portable device local to the vehicle, charging of the battery can be initiated. In another embodiment, based upon detection of the portable device local to the vehicle, physical connection of a charging cable supplying energy to the EV can be unlocked to facilitate removal of the charging cable plug from a charging socket on the electric vehicle.

Turning now to the drawings, FIG. 1 illustrates a system 100 that can be utilized to control a charging operation(s) of a battery located on an electric vehicle (EV). System 100 comprises an EV 105 with a battery 107 located on the EV 105. Battery 107 can be charged by an electric charging station 110 via charging cable 115, with cable 115 connected to EV 105 via a plug 116 (e.g., J1772, Combined Charging System (CCS), SAE Combo, Charge de Move (CHAdeMO), TESLA®) located at an end of cable 115. During charging, plug 116 is located in a charging port (charging socket) 117 on EV 105, wherein the port 117 is connected to the battery 107. Charging of the battery 107 can be controlled by a battery management system (BMS) 108, wherein the BMS 108 can be configured to operate in conjunction with a computer system 160 with various commands, instructions, data, etc., being communicated between the BMS 108 and the computer system 160, as described further herein.

In an embodiment, a charging operation can be underway at the EV 105, with the charging station 110 supplying charge to the EV 105 via the cable 115. As a function of the charging operation, the charging station 110 has been coupled with the battery 107 and BMS 108, whereby the various operating checks and handshakes (e.g., regarding charging protocols and conditions) between charging station 110 and BMS 108 have been completed (e.g., based upon any of level 1 charging (110-120V), level 2 charging (220-240V), level 3 (400V+) DC fast charging, AC charging, DC charging, battery voltage limit, battery current limit, battery capacity, battery condition, battery deterioration, battery temperature, charge slow down rate, charger capacity, ramping up charging, ramping down charging, charging decay, and the like) and charging has commenced. The various embodiments presented herein relate to any charging operation, whether it is a home charging system (e.g., charging station 110 is located at a home garage), a public charging station comprising one or more charging stations (e.g., charging station 110 is one of many charging stations located in the public charging station), etc.

In an embodiment, an operator 120 (e.g., owner, driver) can be standing or moving (e.g., walking, fast pacing, running) proximate to the EV 105. The operator 120 can be carrying a portable device (also known as a mobile device) 125, wherein the portable device 125 can be any of a keyfob/smartkey, a smartphone, a cellphone, a personal digital assistant (PDA), a handheld computing device, a smartwatch, a tablet computer, a laptop computer, or any other suitable device to facilitate one or more embodiments herein. In an embodiment, the portable device 125 can also have operating thereon a software application 126 enabling the operator 120 to log into their account with a company providing the electric charging, to edit one or more configurations 192A-n (as further described herein), etc. As further described herein, the portable device 125 can further include a transceiver 127 and an antenna 129, which can be utilized to transmit signals from the portable device 125 (e.g., to one or more components/devices located at the EV 105), receive signals at the portable device 125 (e.g., from one or more components/devices located at the EV 105), process received signals, etc.

In a further embodiment, an identification signal 131 (comprising an identification code) can be transmitted (e.g., under instruction of software application 126) by the transceiver 127 at the portable device 125, wherein the identification signal 131 enables the operator 120 to interface with a billing system at the public charging station to facilitate the operator 120 accessing their account and conducting an operation such as billing, initiating a charging operation, contactless payment processing, and the like.

In another embodiment, the identification signal 131 can be transmitted during communication between the portable device 125 and the EV 105, to ensure that the correct portable device 125 is controlling the battery charging operation of EV 105. For example, charging of EV 105 may occur at a public charging center comprising a plurality of charging stations 110, and accordingly, a number of EVs are located there, including EV 105. More than one operator (including operator 120) may be carrying a portable device configured to control charging of a respective EV to which each respective portable device is communicatively coupled and controls charging thereof. By utilizing a unique identification signal for each portable device, erroneous cessation of charging (and/or maintaining/re-initiating charging) of EV 105 can be prevented due to a random portable device (e.g., not portable device 125) transmitting battery charging control signals using the same communication technology as portable device 125 being in vicinity of the EV 105. The identification signal 131 enables only communications from portable device 125 that are configured to operate with EV 105 to be processed and operated on by the computer system 160 (and the one or more components operating thereon).

As shown in FIG. 1, communications between portable device 125 and EV 105 can comprise a plurality of signals 135A-n (e.g., radio waves). The signals 135A-n can respectively include data 136A-n (e.g., a first signal 135A includes first data 136A, a second signal 135B includes second data 136B, an nth signal 135n includes nth data 136n). The data 136A-n can include any of time data, position data, location data, motion data, velocity data, transmission data, and the like, from which a current position/location or motion of the portable device 125 can be determined (as further explained herein). The plurality of signals 135A-n can be received and processed by one or more components located at computer system 160, or communicatively coupled to computer system 160. In an embodiment, a signaling component 170 on the computer system 160 can be configured to control generation of the signals 135A-n for transmission to the portable device 125. In a further embodiment, a transceiver 171 can be communicatively coupled to the signaling component 170, and the transceiver 171 can be configured to generate the signals 135A-n and initially transmit the signals 135A-n to the portable device 125 (via an antenna 172 located on the EV 105). The transceiver 171 can be further configured to receive the signals 135A-n once they are returned/received from the portable device 125 and forward the returned signals 135A-n, or data pertaining thereto (e.g., timing data), to the signaling component 170. The transceiver 171 can be configured to receive/transmit the plurality of signals 135A-n via an antenna 172.

In an embodiment, the plurality of signals 135A-n can be generated by signaling technology suitable to enable any of the position, location, motion, time, etc., of the portable device 125 to be determined with a sufficient degree of accuracy by one or more components included in the computer system 160. In an embodiment, the signaling technology utilized to generate the plurality of signals 135A-n can be ultra-wideband (UWB) frequency technology. UWB technology involves a high transmission rate of radio pulses (e.g., signals 135A-n from the portable device 125) across a wide spectrum frequency. A UWB transceiver (e.g., transceiver 171 coupled to computer system 160) can transmit/receive the signals 135A-n, and one or more components located at computer system 160 can process data included in, or pertaining to, the signals 135A-n to determine the location and/or motion of the portable device 125 relative to the EV 105 (as further described herein). UWB technology is beneficial as the generation of the plurality of signals 135A-n requires low power with a high bandwidth (e.g., 500 MHz) enabling a large amount of data to be transmitted between the EV 105 (e.g., by transceiver 171) and the portable device 125. Further, the signals 135A-n are low-power signals that cause minimal interference with other radio technology transmissions that may be present in the vicinity of EV 105 and/or portable device 125. Development of UWB technology continues, with accuracy of detection being continually improved, with accuracies to a fraction of an inch (e.g., DECAWAVE® devices enable distances of 0.78 inches (2 cm) to be determined). Further, UWB technology has an extensive range, for example, UWB technology can be utilized to determine the relative distance (and position) between two devices (e.g., portable device 125 and EV 105) in a line-of-sight operation of up 656 feet (200 meters) based on the IEEE 802.15.4a standard.

It is to be appreciated that while the various embodiments presented herein describe the plurality of signals 135A-n being generated using UWB technology, any suitable technology can be utilized to facilitate determination of position, location, motion, etc., of the portable device 125. For example, the plurality of signals 135A-n can be generated using BLUETOOTH® technology, Wi-Fi technology, RFID technology, and the like.

In an embodiment, Near Field Communication (NFC) radio technology can be utilized, wherein the portable device 125 has a Radio Frequency Identification (RFID) device located thereon (e.g., located into a membership card utilized for a public charging station), and transceiver 171 generates a radio frequency field which inductively couples with the RFID device located on the portable device 125. Based upon the inductive coupling, the signaling component 170 determines that the RFID-attached portable device 125 is proximate (e.g., near field) to the transceiver 171 and based upon how long the RFID-attached portable device 125 stays proximate to the transceiver 171, the location component 175 (in conjunction with one or more configurations 192A-n) can determine whether the operator 120 intends for the charging of the EV 105 to be ceased or to continue. In an embodiment, RFID technology can operate in the 13.56 MHz frequency band, as well as any other suitable frequencies applicable to RFID technology.

As further shown in FIG. 1, a detection zone 140 can be configured, and in an embodiment, motion and position of the portable device 125 outside and/or inside of the detection zone 140 can be determined, e.g., as the portable device 125 is being conveyed into, out, or through, the detection zone 140 by the operator 120. The detection zone 140 can be configured (e.g., via configurations 192A-n, as further described herein) with any size to detect location and/or motion of the portable device 125, in accordance with at least one of the transmission/detection range of the signals 135A-n.

Figure 2:
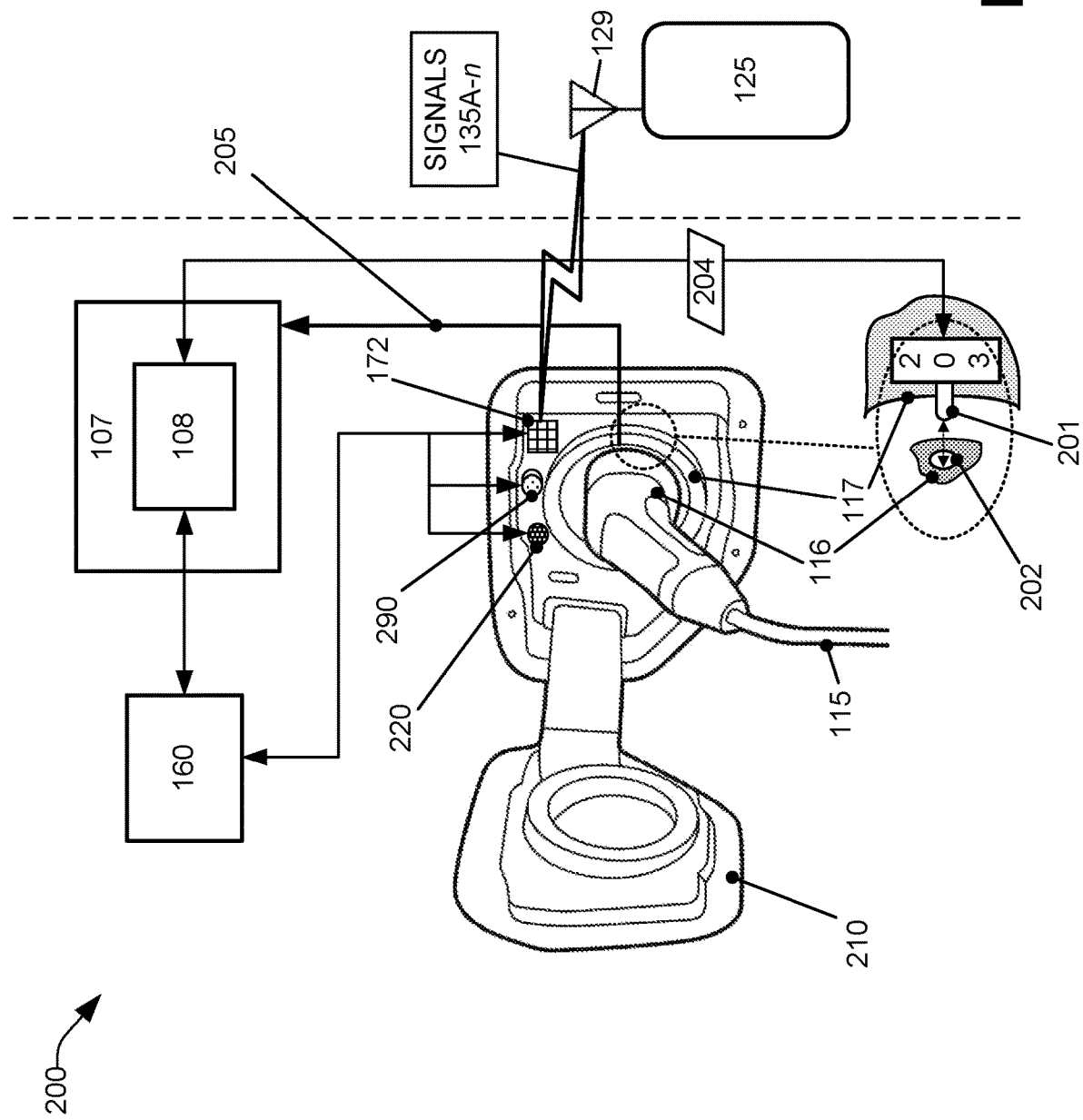
FIG. 2 is a block diagram representation of example components related to controlling charging of an electric vehicle based upon position and/or location of a portable device, in accordance with various aspects and implementations of the subject disclosure.

In an embodiment, the antenna 172 can be located at the port 117 (as also shown in FIG. 2) enabling the proximity of the portable device 125 to be determined relative to the position of the port 117. Hence, when the operator 120 (conveying the portable device 125) is local to the port 117, e.g., in readiness to detach the cable 115 from the port 117 when charging of the battery 107 is to be terminated, the presence of the portable device 125 can be detected and termination (e.g., decoupling) of the charging process can be initiated. However, it is to be appreciated that the antenna 172 can be located anywhere on EV 105 to facilitate the one or more embodiments presented herein.

The computer system 160 can further comprise or be operatively coupled to at least one processor 162 and at least one memory 164. In various embodiments, the at least one memory 164 can store executable instructions (e.g., a signaling component 170, an identification component 173, a charge control component 180, a location component 175, a configuration component 190, an image component 195, an artificial intelligence (AI) component 197, etc.) that when executed by the at least one processor 162, facilitate performance of operations defined by the executable instruction. The computer system 160 can further include a bus 166 (e.g., a system bus, a device bus) that communicatively couples the various components of the computer system 160, e.g., the at least one processor 162, the at least one memory 164, the signaling component 170, the identification component 173, the charge control component 180, the location component 175, the configuration component 190, the AI component 197. In an embodiment, memory 164 can have stored therein a plurality of configurations (templates) 192A-192n, which can be utilized to determine whether charging of EV 105 should be maintained or terminated, as further described herein.

In an embodiment, the signaling component 170 can receive the plurality of signals 135A-n from the transceiver 171 in conjunction with the identification signal(s) 131. The signaling component 170 can operate in conjunction with the identification component 173, wherein the identification component 173 can be configured to analyze the identification signal(s) 131 to determine that the signals 135A-n are being received from portable device 125 that is configured to control a charging operation(s) at EV 105. In the event of an identification signal received at transceiver 171 does not match the identification signal 131 that the computer system 160 is configured to function with, the plurality of signals associated with the unexpected identification signal can be ignored. In the event of the identification signal(s) 131 has the expected identifier data, the plurality of signals 135A-n can be processed by the one or more components comprising the computer system 160. It is to be appreciated that while FIG. 1 depicts the identification component 173 located in the computer system 160, the identification component 173 can be located in the transceiver 171, where, in an embodiment, the transceiver is located remote from the computer system 160. Further, it is to be appreciated that while FIG. 1 depicts the transceiver 171 being externally located to the computer system 160 (e.g., the transceiver 171 is utilized by a plurality of components/devices located on EV 105), the transceiver 171 can be incorporated (co-located) into the computer system 160.

The location component 175 can be configured to analyze the plurality of signals 135A-n, and any data included therein, to determine any of motion, location, position, etc., of the portable device 125. In an embodiment, where the plurality of signals 135A-n have been generated using UWB technology or similar technology, the location component 175 can perform Time-of-Flight (ToF) analysis of the plurality of signals 135A-n. ToF analysis can be utilized when two devices (e.g., portable device 125 and EV 105) configured with ToF technology are proximate to each other. When the two devices are proximate to each other, the two devices (e.g., portable device 125 and computer system 160 located on EV 105) can initiate ranging (measuring, determining) the distance between the two devices. The ToF ranging operation determines how long it takes for a pulse (in the plurality of signals 135A-n) to travel from point A (e.g., the antenna 172 on EV 105) to point B (e.g., the antenna 129 located on portable device 125), and then return to point A. In an embodiment, the location component 175 can use the ToF data obtained from analyzing the plurality of signals 135A-n to calculate the location of the portable device 125.

The location component 175 can utilize a plurality of configurations 192A-n to facilitate determination of whether the portable device 125 is being conveyed in such a manner that it can be inferred that the operator 120 desires the charging of EV 105 to cease, or alternatively, to be maintained. In an embodiment, the plurality of configurations 192A-n can be pre-installed (e.g., by a manufacturer of EV 105), and can further be presented for editing of one or more parameters included in respective configurations 192A-n as described infra.

In a first example scenario, based upon the plurality of signals 135A-n being transmitted between the portable device 125 and the EV 105 (e.g., via respective antennas 129 and 172) the location component 175 determines that the portable device 125 is within detection zone 140 (wherein detection zone 140 can be established based upon a distance from the EV 105). A configuration 192A has been established with parameters such that, if the portable device 125 is determined to a) be within detection zone 140 (satisfying a first parameter) and b) stationary for x seconds (e.g., 4 seconds) (satisfying a second parameter), it can be inferred that the operator 120 wants the charging of EV 105 to be terminated (e.g., the operator 120 wants to drive the EV 105). In the event of the location component 175 determining that the parameters of configuration 192A have been satisfied, the location component 175 can transmit a termination signal 176 to the charge control component 180 to terminate charging of the EV 105. Accordingly, upon receipt of the termination signal 176, the charge control component 180 can terminate the charging operation and initiate a decoupling between the electric charging station 110 (via cable 115 and plug 116) and the EV 105 (via port 117). In an embodiment, the charge control component 180 can initiate termination of the charging operation by transmitting a "terminate charging" signal 182 to the BMS 108, whereupon, upon receipt of the "terminate charging" signal 182, the BMS 108 is configured to perform a decoupling process to cease charging of the EV 105. In an alternative embodiment, the location component 175 can be communicatively coupled directly to the BMS 108, with the termination signal 176 being transmitted directly to the BMS 108, whereupon, upon receipt of the termination signal 176, the BMS 108 is configured to perform a decoupling process to cease charging of the EV 105 and battery 107.

In a second example scenario, based upon the plurality of signals 135A-n being transmitted between the portable device 125 and the EV 105, the location component 175 determines that the portable device 125 is within detection zone 140. A configuration 192B has been established with parameters such that, if the portable device 125 is determined to a) be within detection zone 140 (satisfying a first parameter) and b) leaves prior to required duration of time (as outlined in configuration 192A) (satisfying configuration 192B's second parameter but not the second parameter of 192A), it can be inferred that the operator 120 does not want to terminate charging of EV 105, but rather wants to maintain charging of battery 107. Similar to the first example scenario, in the event of the location component 175 determining that the parameters of configuration 192B have been satisfied, the location component 175 can transmit a maintain signal 178 to the charge control component 180 to maintain charging of the EV 105. Accordingly, upon receipt of the maintain signal 178, the charge control component 180 can be configured to do nothing and leave the BMS 108 in a current state of maintaining the charging operation, or the charge control component 180 can send a "maintain charging" signal 184 to the BMS 108, whereupon the BMS 108 is configured to maintain the charging of battery 107. In an alternative embodiment, the location component 175 can be communicatively coupled directly to the BMS 108, with the maintain signal 178 being transmitted directly to the BMS 108, whereupon, upon receipt of the maintain signal 178, the BMS 108 is maintains the charging of battery 107.

In a third example scenario, based upon the plurality of signals 135A-n being transmitted between the portable device 125 and the EV 105, the location component 175 determines that the portable device 125 is within detection zone 140. A configuration 192U has been established with parameters such that, if the portable device 125 is determined to a) be within detection zone 140 (satisfying a first parameter) and b) stationary for x seconds (e.g., 4 seconds) (satisfying a second parameter), it can be inferred that the operator 120 wants the charging cable 115 to be unlocked/released from the EV 105 to facilitate removal of the charging cable 115. In the event of the location component 175 determining that the parameters of configuration 192U have been satisfied, the location component 175 can transmit an unlock signal 179 to the charge control component 180 to initiate the unlocking procedure of cable 115. Accordingly, upon receipt of the unlock signal 178, the charge control component 180 can send an "unlock the cable" signal 185 to the BMS 108, whereupon the BMS 108 is configured to initiate unlocking of the charging cable, as further described herein with reference to at least FIGS. 2, 4, and 5.

Other configurations and parameter settings can be applied to configurations 192A-n. For example, in a fourth example scenario, a configuration 192C can be established such that motion of the portable device 125 into detection zone 140 has a trajectory determined to be towards the port 117 (e.g., based upon signals 135A-n, signaling component 170, location component 175, etc.), and it can be inferred in accordance with configuration 192C (e.g., the parameters of configuration 192C are satisfied) that the operator 120 conveying the portable device 125 wants to terminate the charging of battery 107. Accordingly, the termination process described with respect to the first example scenario can be performed to terminate charging of battery 107.

In another example, a fifth scenario, a configuration 192D can be configured such that motion of the portable device 125 has a trajectory into detection zone 140 with the speed of motion decreasing as the portable device 125 is moved closer to the port 117 (e.g., based upon signals 135A-n, signaling component 170, location component 175, etc.), and it can be inferred in accordance with configuration 192D (the parameters of configuration 192D are satisfied, e.g., velocity of approach of portable device 125 is reducing, or velocity of approach of portable device 125 is less than a pre-configured velocity) that the operator 120 conveying the portable device 125 wants to terminate the charging of battery 107. Accordingly, the termination process described with the first example scenario can be performed to terminate charging of battery 107.

In a further example, a sixth scenario, a configuration 192E can be configured such that after the cable 115 has been connected to the EV 105 (e.g., plug 116 is inserted into port 117) it is required that the portable device 125 has to exit the detection zone 140 for a given duration of time (e.g., x seconds) and then return into detection zone 140 before charging of the battery 107 can be terminated.

In a further example, a seventh scenario, a configuration 192F can be configured such that if the portable device 125 is determined (e.g., by the location component 175) to be leaving the detection zone 140, current charging of the battery 107 is to be maintained.

Further, in an eighth scenario, a configuration 192G can be configured such that if the operator 120 recently connected plug 116 to port 117, and the portable device 125 has a motion indicating that the portable device 125 is being conveyed out of detection zone 140 (e.g., as determined by the location component 175), charging of the battery 107 is to be initiated.

In a further example, a ninth scenario, a configuration 192H can be configured such that if the plug 116 was recently unlocked at port 117 and the portable device 125 is determined (e.g., by the location component 175) to be located proximate to EV 105 (e.g., within detection zone 140) for a given period of time (e.g., 10 seconds), charging of the battery 107 should be initiate or resumed.

In a further example, a tenth scenario, a configuration 192I can be configured such that, regardless of position or motion of the portable device 125 (e.g., as determined by the location component 175), plug 116 should be locked to port 117 and charging initiated.

In an embodiment, the operator 120 can be moving the portable device 125 in an up-down and/or side-to-side motion (a waving motion), and this motion can be captured in the plurality of signals 135A-n, e.g., based on a repetitive pattern in the ToF signals. Accordingly, the operator 120 can readily use the waving motion of the portable device 125 to indicate their intent for the charging of battery 107 to cease. In another example of usage, the operator 120 can use the waving motion of the portable device 125 to indicate their intent for the charging of battery 107 to be maintained (where charging is currently being performed) and/or initiated (where charging has been previously ceased). Various configurations 192A-n can be configured to capture this motion of the portable device 125, e.g., a configuration 192J can be configured such that if the motion of the portable device 125 is determined to be in a waving motion, the charging of battery 107 is to terminate regardless of whether the operator 120 is in the detection zone 140 or is outside of the detection zone 140 whereby the greater range of the technology generating the plurality of signals 135A-n extends beyond a lesser range configured for the detection zone 140.

It is to be appreciated that the foregoing example scenarios and configurations 192A-n (and respective parameters) are presented simply to provide understanding of the various concepts presented herein, and the various embodiments are not limited to the scenarios presented in the foregoing examples. Any combination of motion of the portable device 125, location of the portable device 125, trajectory of motion of the portable device 125, etc., can be utilized to control ceasing or maintaining charging of the battery 107, wherein the configurations 192A-n can be configured based up the location, trajectory of motion, motion, lack of motion, etc., of the portable device 125 and the action to be performed based upon a particular configuration in the plurality of configurations 192A-n being satisfied, or not, and whether satisfaction of the particular configuration in the plurality of configurations 192A-n indicates that charging of battery 107 is to be terminated or maintained.

As mentioned, computer system 160 can also include an AI component 197. In an embodiment, the AI component 197 can monitor operation of the charging operation(s) being conducted on battery 107 as a function of the position, motion, etc., of portable device 125. The AI component 197 can monitor how successfully the intent of the operator 120 matches the battery charging operations being controlled by computer system 160, BMS 108, etc. Based on the degree of success or failure (e.g., as recorded in tally data 498, per FIG. 4) of the battery charging control operations, the AI component 197 can recommend one or more edits to configurations 192A-n and their respective parameters (FIG. 4, parameters 420A-n) to improve performance (e.g., success) of the various embodiments presented herein. For example, a configuration 192P has a "size of detection zone" that is set too large for a floorspace in which the EV 105 is parked during charging of battery 107. Owing to the overly large detection zone, the motion of an operator 120 while carrying the portable device 125 is misinterpreted, and charging of the battery 107 is erroneously terminated. The AI component 197 can generate alternative settings for any of the parameters 420A-n for presentation (e.g., via HMI 410 described in FIG. 4) to the operator 120, to assist the operator 120 successfully controlling the battery charging operation of battery 107. Such an approach can facilitate customizing any manufacturer-created configurations 192A-n to take into account the potentially unique operating conditions of the various embodiments presented herein. In another embodiment, to improve the success of the various embodiments presented herein, the AI component 197 can recommend the operator 120 select for use a different configuration (in the configurations 192A-n) than is currently being used. In an embodiment, the AI component 197 can compare a current success rate (e.g., per tally data 498, FIG. 4) and an expected success rate, and make a determination whether to adjust the configuration (e.g., any of configurations 192A-n)

FIG. 2 illustrates an example system 200 that can be utilized to control a charging operation(s) being conducted at an EV 105. System 200 is a close-up view of the plug 116 and port 117 configuration, as previously described in FIG. 1. As previously mentioned, and as shown in FIG. 2, the electric charging station 110 is connected to the EV 105 (and battery 107) via the cable 115, with the plug 116 located in the port 117. In an embodiment, electrical energy from cable 115 can be conveyed directly to battery 107, via connection 205. Further, BMS 108 can be coupled to computer system 160, with computer system 160 also coupled to antenna 172, a light 220, and/or a charging button 290.

As shown in FIG. 2, a charging cover (door, flap) 210 is in an open position to facilitate the connection of the plug 116 to the port 117. As further shown in FIG. 2, the plug 116 can be secured/locked in place in the port 117, wherein, in an embodiment, a pin 201 located in the internal surface of the port 117 can engage with a hole 202 located on the external/mating surface of the plug 116. Operation of the pin 201, e.g., engagement of pin 201 within the hole 202 and/or withdrawal of the pin 201 from the hole 202 can be performed by any suitable device. In an embodiment, the pin 201 can be operated by a servomotor 203 (or similar apparatus), wherein, operation of the servomotor 203 can be controlled by the BMS 108. For example, upon receipt of an unlock the cable signal 185 from the charge control component 180, the BMS 108 can generate an "unlock" signal 204, which upon receipt by the servomotor 203, the servomotor 203 is configured to disengage the pin 201 from the hole 202, enabling subsequent removal of the plug 116 from the port 117 to facilitate disconnection of the charging cable 115 from the EV 105.

As further shown in FIG. 2, the antenna 172 can be located (incorporated into) local to the port 117. In an embodiment, having the antenna 172 located proximate to the port 117 enables detection of the plurality of signals 135A-n being transmitted from the portable device 125 (via antenna 129) to be determined local to the port 117. For example, the detection zone 140 can be centered on antenna 172 (as depicted in FIG. 1) such that detection and motion monitoring of the portable device 125 can be conducted with regard to the position of the operator 120 relative to the location of the port 117 on the EV 105. Accordingly, with reference to FIG. 1, when the operator is near the EV 105 but at a position remote from the port 117, e.g., as shown at position P on FIG. 1 (front far side of EV 105), any signals 135A-n can be ignored by the transceiver 171 and computer system 160 as the operator is effectively remote to the port 117. However, if the operator 120 advances from position P towards, and into detection zone 140, the position and/or motion of the portable device 125 can begin to be determined by the one or more components comprising computer system 160, as previously described.

In another embodiment, as shown in FIG. 2, a light 220 can be located proximate to the port 117. In an embodiment, the light 220 can provide visual feedback regarding whether the portable device 125 has been detected (or no longer detected) proximate to the port 117, with operation of the light controlled by one or more components comprising computer system 160. For example, when the charging cover 210 is in the open position (e.g., to facilitate connection of the plug 116 in port 117), the light 220 can be visible to the operator 120. The light 220 can be any suitable light device, e.g., a light-emitting diode (LED). The light 220 can be configured (under control of computer system 160) to emit a range of colors based upon detection of the portable device 125, the charging operation being performed at the port 117, and the like. Per the following examples, (a) when the battery 107 is being charged, the light 220 is constantly lit green; (b) when the charging operation is being initiated (e.g., BMS 108 is interfacing with the charging station 110) the light 220 can be configured to flash and emit a green flashing light; (c) when the charging operation is being terminated the light 220 can be configured to flash and emit a yellow flashing light; (d) when no charging of battery 107 is being performed the light 220 can be configured to be constantly lit red; (e) if the portable device 125 is detected proximate to the antenna 172 the light can be configured to flash white; and the like.

Hence, in the event of the portable device 125 being detected and per the various embodiments described herein, the charging of battery 107 is being terminated based upon the determined location and/or motion of the portable device 125, the light 220 can be configured to flash alternating between a yellow light (indicating the charging operation is being terminated) and a white light (indicating the portable device 125 has been detected and the charging operation is being terminated based on the presence of the portable device 125 and one or more configuration 192A-n). In another embodiment, the light 220 can further provide visual feedback regarding the charging status of the battery 107. It is to be noted that the colors described herein are merely examples and any colors, sequence of colors, etc., can be configured.

In a further embodiment, as illustrated in FIG. 2, a charging button 290 can be located proximate to port 117, wherein the charging button 290 can be configured to control charging of the battery 107. For example, the operator 120 intends for the charging operation to terminate charging, continue charging, or initiate charging regardless of what the computer system 160 (and the various components operating thereon) determines the intent of the operator 120 to be. Accordingly, the charging button 290 can be utilized as an override to one or more operations being performed by the computer system 160. As mentioned above, the operator 120 can determine the current charging status of the battery 107 based upon the status of light 220. Accordingly, the operator 120 can utilize the charging button 290 to switch through the respective charging operations, as required.

Figure 3:
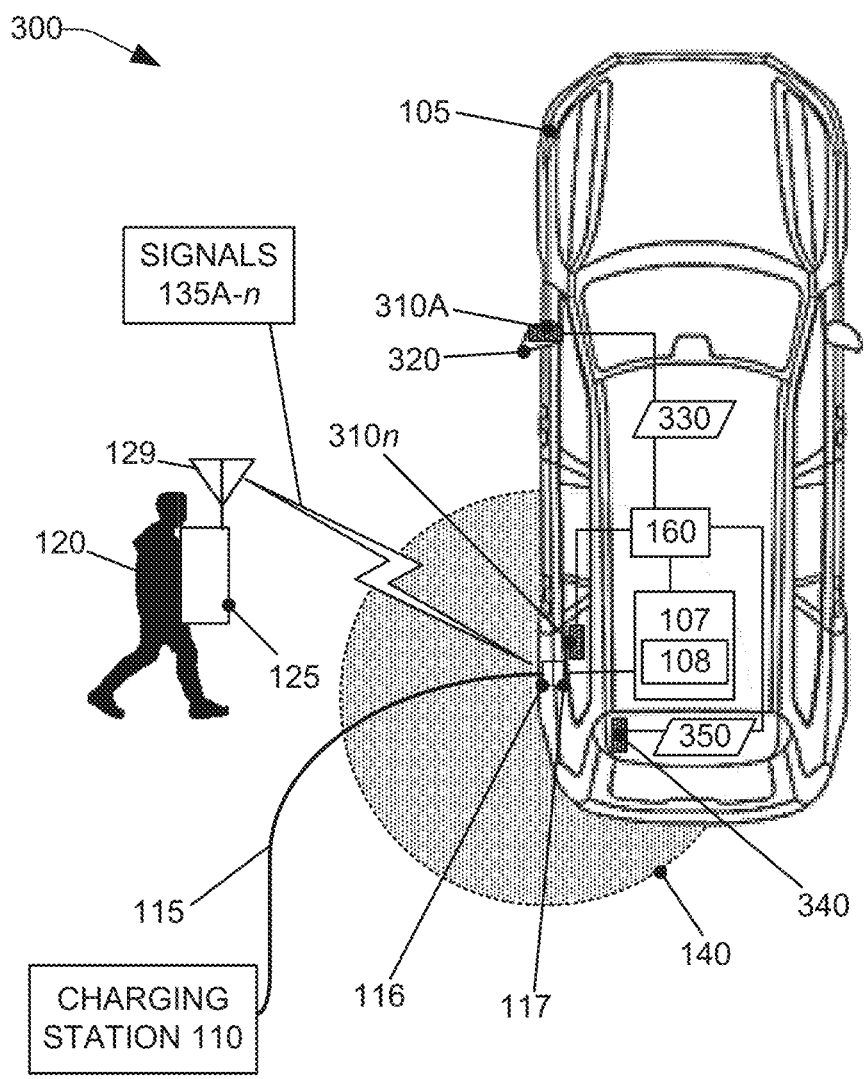
FIG. 3 is a block diagram representation of example components related to controlling charging of an electric vehicle based upon position and/or location of a portable device, in accordance with various aspects and implementations of the subject disclosure.

FIG. 3 illustrates an example system 300 that can be utilized to control a charging operation(s) being conducted at an EV 105. System 300 illustrates a portable device 125 being conveyed (e.g., by operator 120) towards an EV 105. As shown, and as previously described, (ref. FIGS. 1 and 2), the battery 107 is connected to a charging station 110 via a cable 115, wherein the cable 115 is coupled to port 117 via plug 116. As previously described, a detection zone 140 can be configured and centered about the port 117, with motion and positioning of the portable device 125 in the detection zone 140 being detected by one or more components included in the computer system 160. Based upon the determined location and/or motion of the portable device 125 relative to EV 105, a charging operation of the battery 107 can be controlled, e.g., by one or more components included in the computer system 160 in conjunction with the BMS 108.

To further facilitate location of the portable device 125 and/or the operator 120 relative to the location of the EV 105, one or more supplemental devices can be utilized, thereby further enhancing any of the various embodiments presented herein for detecting the portable device 125 and, accordingly, control of the charging operation of the battery 107. In an embodiment, one or more cameras 310A-n located on EV 105 can be utilized to provide supplemental information regarding the position and motion of the portable device 125 and/or the operator 120. For example, a camera 310A is located in a wing mirror 320 of the EV 105, while camera 310n is located above the port 117. In an embodiment, the camera 310A (and similarly camera 310n) can be facing towards the rear of EV 105 such that the port 117 is in the field of view of the camera 310A. Hence, in the event of signals 135A-n transmitted from the portable device 125 being detected at the antenna 172 (not shown), computer system 160 can also capture image data 330 from the camera 310A, wherein the image data 330 can be in the form of digital images, a digital video, and the like. The image component 195 located in the computer system 160 (ref. FIG. 1) can be configured to process the image data 330. For example, the image component 195 can process the image data 330 and determine whether a person captured in the image data 330 is the operator 120 (e.g., by facial recognition, body mass, etc.). In another example, the image component 195 can process the image data 330 to determine a position of a person (e.g., operator 120) relative to the EV 105 and/or motion of the person relative to the EV 105.

In a further embodiment, a parking sensor 340 can be utilized to detect a presence of the operator 120 and/or the portable device 125. The parking sensor 340 can be configured to utilize any suitable technology, e.g., ultrasonic technology, acoustic technology, radio wave technology, imaging technology, and the like. As illustrated in FIG. 3, the parking sensor 340 located near the port 117 can provide sensor data 350 regarding the position of the operator 120 and/or the portable device 125, wherein the sensor data 350 can be provided to the computer system 160 to supplement the data 136A-n in signals 135A-n to further enable determination of the operator 120 and/or portable device 125, e.g., to minimize erroneous change in state of a charging operation being undertaken of battery 107.

Figure 4:
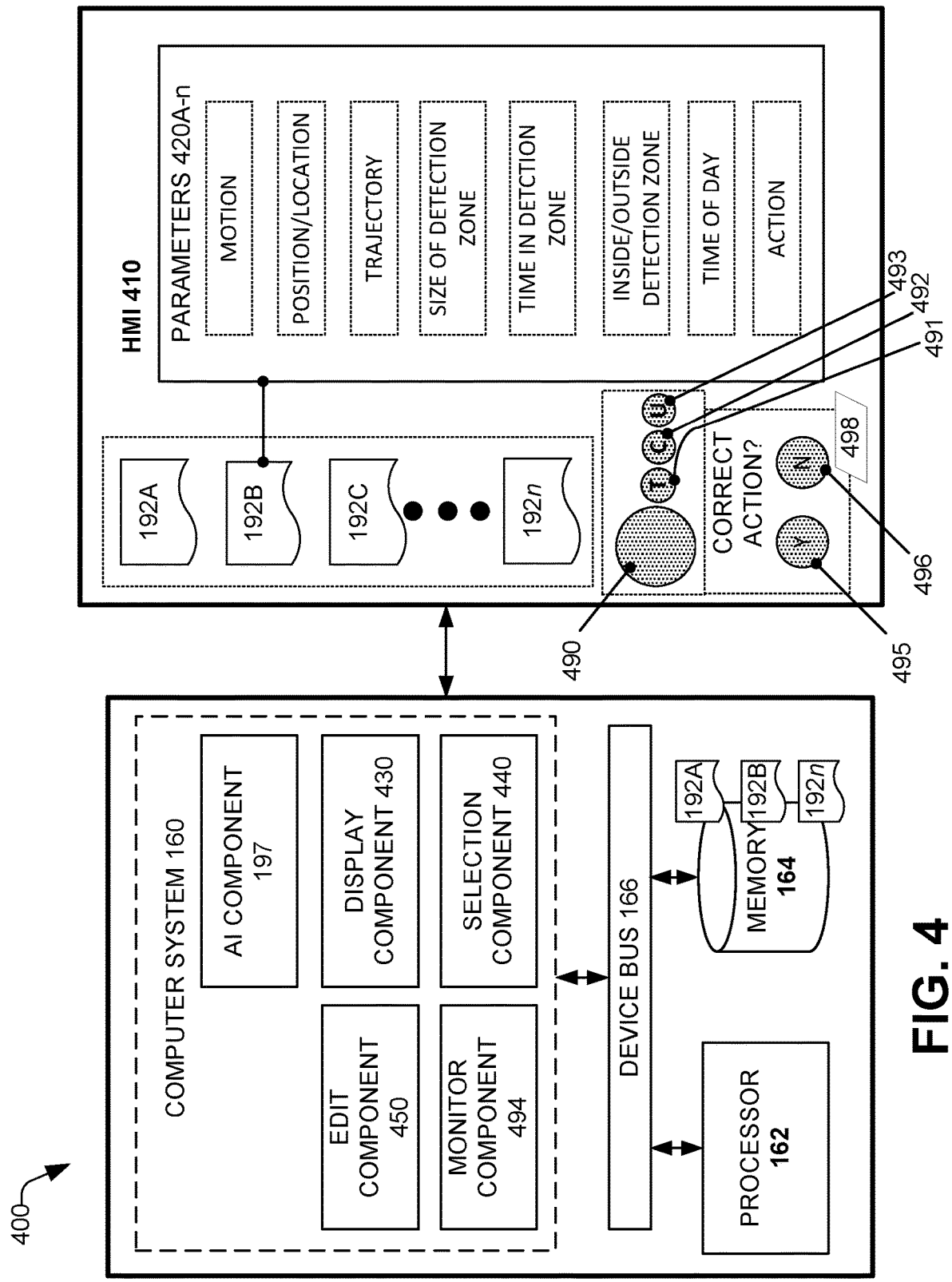
FIG. 4 is a block diagram representation of example components related to utilizing editable configurations to control charging of an electric vehicle based upon position and/or location of a portable device, in accordance with various aspects and implementations of the subject disclosure.

FIG. 4 illustrates an example system 400 that can be utilized to control a battery charging operation(s) being conducted at an EV 105. FIG. 4 illustrates a human machine interface (HMI) 410 being utilized to edit one or more of the configurations 192A-n, wherein the HMI 410 can operate in conjunction with the computer system 160, and one or more components located thereon. As previously mentioned, the configurations 192A-n can include a plurality of parameters 420A-n, whereby adjustment of the parameters 420A-n enables a plurality of configurations 192A-n to be configured to facilitate controlling the charging of battery 107 as a function of the motion and/or location of the portable device 125.

In an embodiment, the HMI 410 can be located in, or form part, of a dashboard/display console located on EV 105 (e.g., in the interior of EV 105). In another embodiment, the HMI 410 can be presented as part of an application (e.g., software application 126) displayed on the portable device 125 whereby configurations, parameters, settings, etc., can be edited on the portable device 125 and transmitted to the computer system 160 to update any settings stored thereon.

As previously mentioned regarding FIG. 1, the configurations 192A-n can be stored in a memory 164, whereby a display component 430 operating on computer system 160 can be configured to display the respective configurations 192A-n on the HMI 410. FIG. 4 illustrates configurations 192A-n being presented on HMI 410. A selection component 440 in computer system 160 can be configured to select a configuration for further display, whereby in the example presented in FIG. 4, configuration 192B has been selected, and parameters 420A-n are presented on the HMI 410 screen. In a non-limiting list, the parameters 420A-n can include "motion", "position/location", "trajectory of motion", "size of detection zone", "time in detection zone", "inside/outside detection zone", "time of day", "action", and the like. It is to be appreciated that any parameter can be presented on HMI 410, wherein the parameter(s) can be utilized to facilitate determining motion and location of the portable device 125 and controlling charging of battery 107, based thereon. An edit component 450 located in computer system 160 can be configured to enable editing/setting of a value for each of the parameters 420A-n (e.g., values adjusted by entering a value, using a slider, etc.).

Parameters 420A-n can also include an "action" parameter for presentment, whereby, in the event of a configuration 192A-n (e.g., 192B) being satisfied, e.g., the various parameters 420A-n configured for the respective configuration (e.g., 192B), the set "action" can be utilized to control operation of the charging of battery 107. For example, if the "motion" parameter in parameters 420A-n for configuration 192B is set to "waving" and the "action" is set to "terminate", in the event of the portable device 125 is determined (e.g., by location component 175) to being moved with a waving action, it is determined that the person waving the portable device 125 wants to cease charging of the battery 107, a "terminate charging" signal 182 can be transmitted to the BMS 108 for the BMS 108 to initiate termination of charging of battery 107.

In an alternative example scenario, the parameters 420A-n could be configured such that "time in zone" is set to 'more than 5 seconds', "trajectory" is set to 'towards EV', and "action" is set to 'terminate'. It is determined that the portable device 125 (conveyed by operator 120) has a trajectory of motion towards the EV 105 (e.g., into detection zone 140), but the portable device 125 is determined to only be in the detection zone 140 for less than 3 seconds. Accordingly, no 'termination' signal is transmitted to the BMS 108 based on this configuration. In an alternative embodiment, in view of the portable device 125 being detected in the detection zone 140 but for an insufficient period of time, a "maintain charging" signal 184 can be transmitted to the BMS 108.

In a further embodiment, as previously described, an operating condition can be the EV 105 is connected to the charging station 110 via cable 115, with plug 116 engaged in socket 117, but the battery 107 is not undergoing charge (e.g., the charging operation of battery 107 may have ceased as battery 107 has reached a desired charged). The plug 116 is secured in the socket 117 by the pin 201 engaged in hole 202. Accordingly, the "action" parameter can be configured to "unlock the cable", whereby, when the various parameters 420A-n for a configuration (e.g., a configuration 192U) have been satisfied, an "unlock" signal can be transmitted to the BMS 108, which further controls the plug 116 to be unlocked from the socket 117 (e.g., an unlock signal from the BMS 108 causes the servomotor 203 to withdraw the pin 201 from the hole 202) for subsequent disconnection of the cable 115 from the EV 105.

In another embodiment, as shown in FIG. 4, a charging button 490 can be displayed on the HMI 410, wherein the charging button 490 can control charging of the battery 107. The charging button 490 can be configured to have functionality comparable to those of the charging button 290, as described with reference to FIG. 2. In an embodiment, to assist the operator 120 to select their desired charging operation, based upon the selected state of the charging button 490, a first indicator 491 can be presented indicating that TERMINATE charging has been selected, a second indicator 492 CHARGE (e.g., maintain charging, or re-initiate charging) has been selected, or a third indicator 493 UNLOCK (e.g., unlock the charging cable 115 from the EV (e.g., plug 116 from port 117, via pin 201 extracted from hole 202) has been selected.

In a further embodiment, computer system 160 can further comprise a monitor component 494, wherein the monitor component 494 can be configured to keep a tally of the success of the various embodiments presented herein regarding successful termination, maintaining, initiating of a charging operation of the battery 107. As shown, HMI 410 can display action buttons 495 and 496 which can be utilized by the operator 120 to indicate how successfully the computer system 160 is correctly determining the intent of the operator 120 regarding the charging operation to be performed. In the event of the computer system 160 is correctly determining the intent, the operator 120 can select "YES" action button 495, and alternatively, where the intent is being incorrectly determined, the 120 can select "NO" action button 496. The respective YES and NO entries can be tallied, e.g., as tally data 498, which can be stored in memory 164 of the computer system 160. As further described herein, AI component 197 can review the tally data 498 to determine whether adjustments need to be made to a currently utilized configuration (e.g., any of selected configurations 192A-n), or an alternative configuration (e.g., any of configurations 192A-n) should be utilized to improve successful operation of the one or more embodiments presented herein. The tally data 498 can be supplemented based upon the status of the charging button 490 with regard to how quickly the charging button 490 was selected after the charging operation (e.g., terminate charging) was applied using charging button 490. In an embodiment, information regarding the configurations 192A-n, e.g., respective setting of parameters 420A-n, tally data 498, can be transmitted to the manufacturer (e.g., via wi-fi, the cloud, etc.) to assist with further development of the configurations.

FIGS. 5-9 illustrate example, non-limiting methodologies relating to controlling a battery charging operation at an EV. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein. The various methodologies presented herein can be applicable to at least the various embodiments presented herein, e.g., as discussed with at least reference to FIGS. 1-4.

Figure 5:
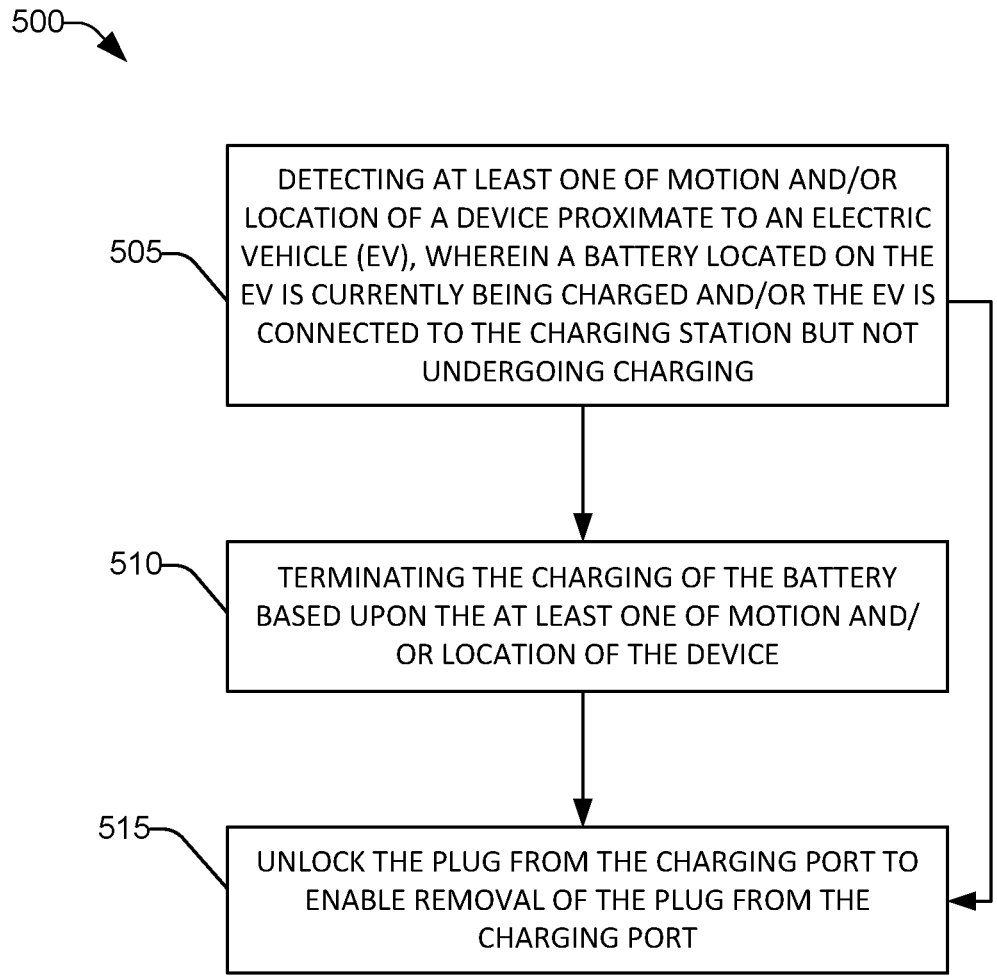
FIG. 5 is a flow diagram showing example operations related to controlling a battery charging operation and/or cable disconnection based upon location/motion of a portable device, in accordance with various aspects and implementations of the subject disclosure.

FIG. 5 illustrates a flow diagram for a computer-implemented methodology 500 for controlling a charging operation of a battery (e.g., battery 107) located on an EV (e.g., EV 105) based upon determining location and/or motion of a portable device (e.g., portable device 125) proximate to the EV.

At 505, the computer-implemented method 500 can comprise detecting, by a system operatively coupled to a processor (e.g., signaling component 170, location component 175) at least one of motion and/or location of a portable device (e.g., portable device 125) proximate to an EV (e.g., EV 105), wherein a battery (e.g., battery 107) is currently undergoing a charging operation, e.g., at a charging station (e.g., electric charging station 110).

At 510, the computer-implemented method 500 can further comprise terminating the charging operation of the battery (e.g., battery 107) based upon the at least one of motion and/or location of the portable device (e.g., portable device 125).

At 515, the computer-implemented method 500 can further comprise unlocking a charging cable connected to the EV, e.g., via a charging port. In an embodiment, the charging cable is connected to the EV by a plug (e.g., plug 116) located in the charging port (e.g., port 117). The plug can be secured in the port by any suitable means, e.g., a pin (e.g., pin 201) incorporated into the port can engage with a hole (e.g., hole 202) incorporated into the plug. Engagement/disengagement of the pin in the hole can be controlled by a locking component (e.g., a servomotor 203). Operation of the locking component (e.g., engagement/disengagement of the pin in the hole) can be controlled based upon a signal received from a component/device (e.g., BMS 108) configured to control one or more charging operations of the battery (e.g., battery 107).

It is to be appreciated that while FIG. 5 has been described depicting the methodology progressing from 505 to 510 to 515, an operating condition can occur where the battery (e.g., battery 107) is currently not being charged, but the EV (e.g., EV 105) is connected to a charging station (e.g., charging station 110) via a cable (115), e.g., the charging plug (e.g., plug 116) is located in the charging port (e.g., port 117), and secured (e.g., by pin 201 in hole 202). Accordingly, under such operating condition, the methodology 500 can go from 505 to 515, wherein, upon detection of the portable device (e.g., portable device 125), the plug is unlocked from the port by disengaging the pin (e.g., pin 201) from the hole (e.g., hole 202), enabling the plug to be removed from the port.

Figure 6:
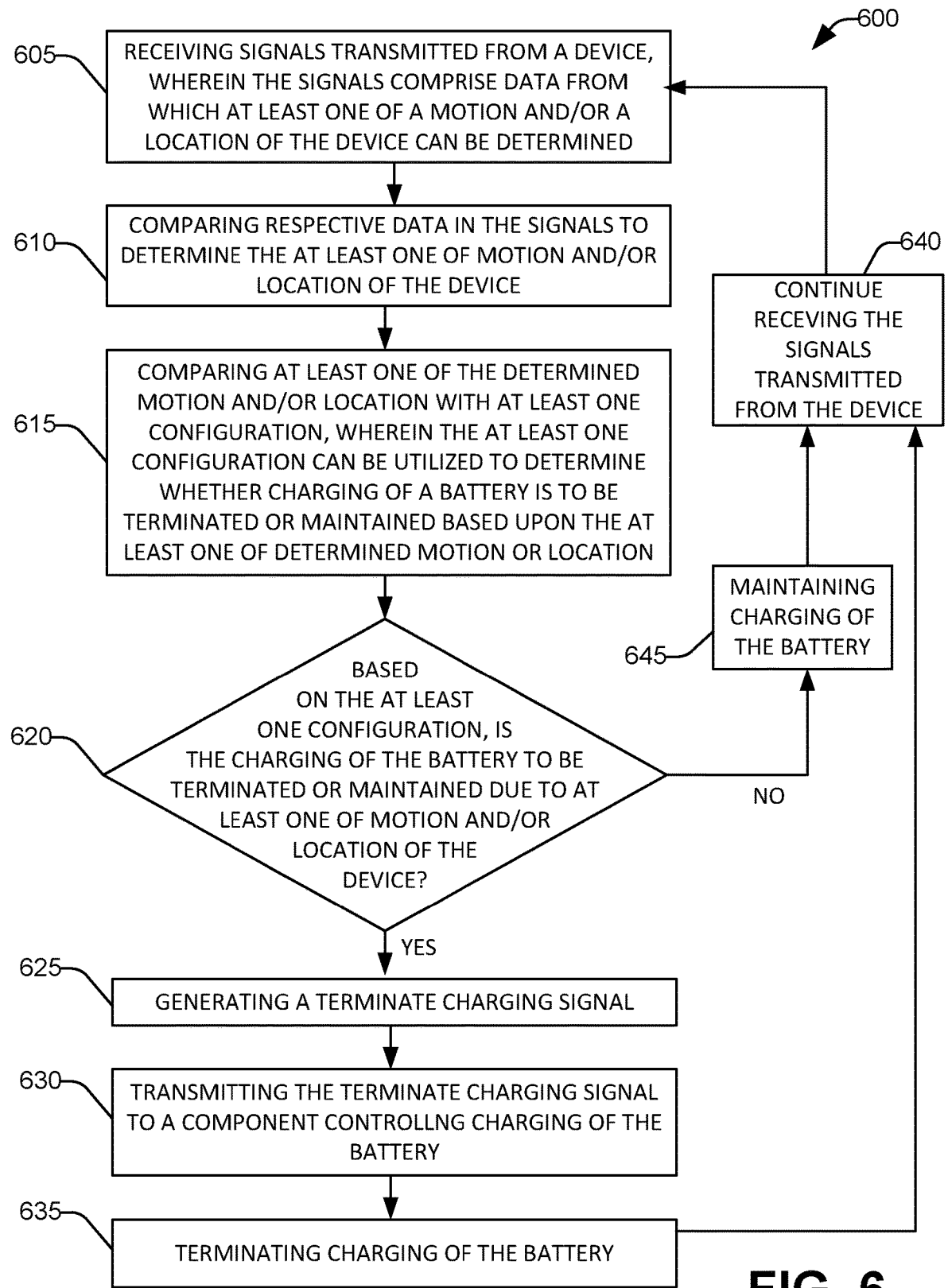
FIG. 6 is a flow diagram showing example operations related to controlling a battery charging operation based upon location/motion of a portable device, in accordance with various aspects and implementations of the subject disclosure.

FIG. 6 illustrates a flow diagram for a computer-implemented methodology 600 for controlling a charging operation of a battery (e.g., battery 107) located on an EV (e.g., EV 105) based upon determining location and/or motion of a portable device (e.g., portable device 125) proximate to the EV.

At 605, the computer-implemented method 600 can comprise receiving (e.g., by transceiver 171 and antenna 172) signals (e.g., signals 135A-n) transmitted from a device (e.g., portable device 125), wherein the signals comprise data (e.g., data 136A-n) from which at least one of a motion and/or a location of the device can be determined.

At 610, the computer-implemented method 600 can further comprise comparing (e.g., by location component 175) respective data (e.g., data 136A-n) in the signals (e.g., signals 135A-n) to determine the at least one of motion and/or location of the device (e.g., portable device 125). In an embodiment, the determination of the at least one of motion and/or location of the portable device can be based upon any suitable technology/methodology, e.g., a ToF process. In an embodiment, the data can indicate respective periods of time it took the respective signals to be transmitted from the EV to the portable device, and return to the EV. Differences or similarities between the respective times can indicate whether the portable device is being held stationary, being waved, moving towards the EV, moving away from the EV, etc.

At 615, the computer-implemented method 600 can further comprise comparing the at least one determined motion and/or location of the device (e.g., portable device 125) with at least one configuration (e.g., configurations 192A-n), wherein the at least one configuration can be utilized to determine (e.g., by location component 175) whether charging of a battery (e.g., battery 107) is to be terminated or maintained based upon the at least one of determined motion or location.

At 620, the computer-implemented method 600 can further comprise, based upon the comparison process identified at 615, controlling whether the charging operation of the battery (e.g., battery 107) is to be terminated or continued? In the event of determining YES, based on the at least one configuration in conjunction with the at least one motion and/or location of the device, the charging of the battery is to be terminated, the computer-implemented method 600 advances to 625.

At 625, the computer-implemented method 600 can further comprise generating (e.g., by charge control component 180) "terminate charging" signal (e.g., "terminate charging" signal 182).

At 630, the computer-implemented method 600 can further comprise transmitting the "terminate charging" signal (e.g., "terminate charging" signal 182) to a component (e.g., BMS 108) controlling one or more charging operations of the battery.

At 635, the computer-implemented method 600 can further comprise, in response to receiving the "terminate charging" signal, initiating (e.g., by BMS 108) one or more "decoupling" operations between the battery and a charging station (e.g., charging station 110) currently connected ("coupled") to the battery (e.g., battery 107). As previously mentioned (ref. FIG. 1), during an initiation of charging between the charging station and the battery, various operating checks and handshakes (e.g., regarding charging protocols and conditions) between the charging station and the system (e.g., BMS 108) controlling charging of the battery occur. Similarly, various operating checks and handshakes can occur during the decoupling process when charging of the battery is being terminated. In an embodiment, the EV can now be physically decoupled from the charging station, e.g., by unplugging a charging cable (e.g., cable 115) by removing a plug (e.g., plug 116) from a charging port (e.g., port 117), e.g., in preparation for the EV to be driven. In another embodiment, the EV can remain physically coupled to the charging station, but the charging of the battery has been terminated. With the scenario of the EV remaining physically coupled to the charging station, the computer-implemented method 600 can advance to 640, wherein operations for receiving/detecting one or more signals (e.g., signals 135A-n) from the portable device can continue by one or more components located on the EV (e.g., transceiver 171, signaling component 170, etc.). Accordingly, the computer-implemented method 600 can return to 605, for the various operations presented in FIG. 6 to be subsequently performed.

Returning to 620, based on the at least one configuration (e.g., any of configurations 192A-n) in conjunction with the at least one motion and/or location of the portable device (e.g., portable device 125), that NO, the charging of the battery (e.g., battery 107) is to be maintained at 645. The computer-implemented method 600 advances to 645 wherein operations for receiving/detecting one or more signals from the device can continue by one or more components located on the EV (e.g., transceiver 171, signaling component 170, etc.). Accordingly, the computer-implemented method 600 can return to 605, for one or more of the various operations presented in FIG. 6 to be subsequently performed.

Figure 7:
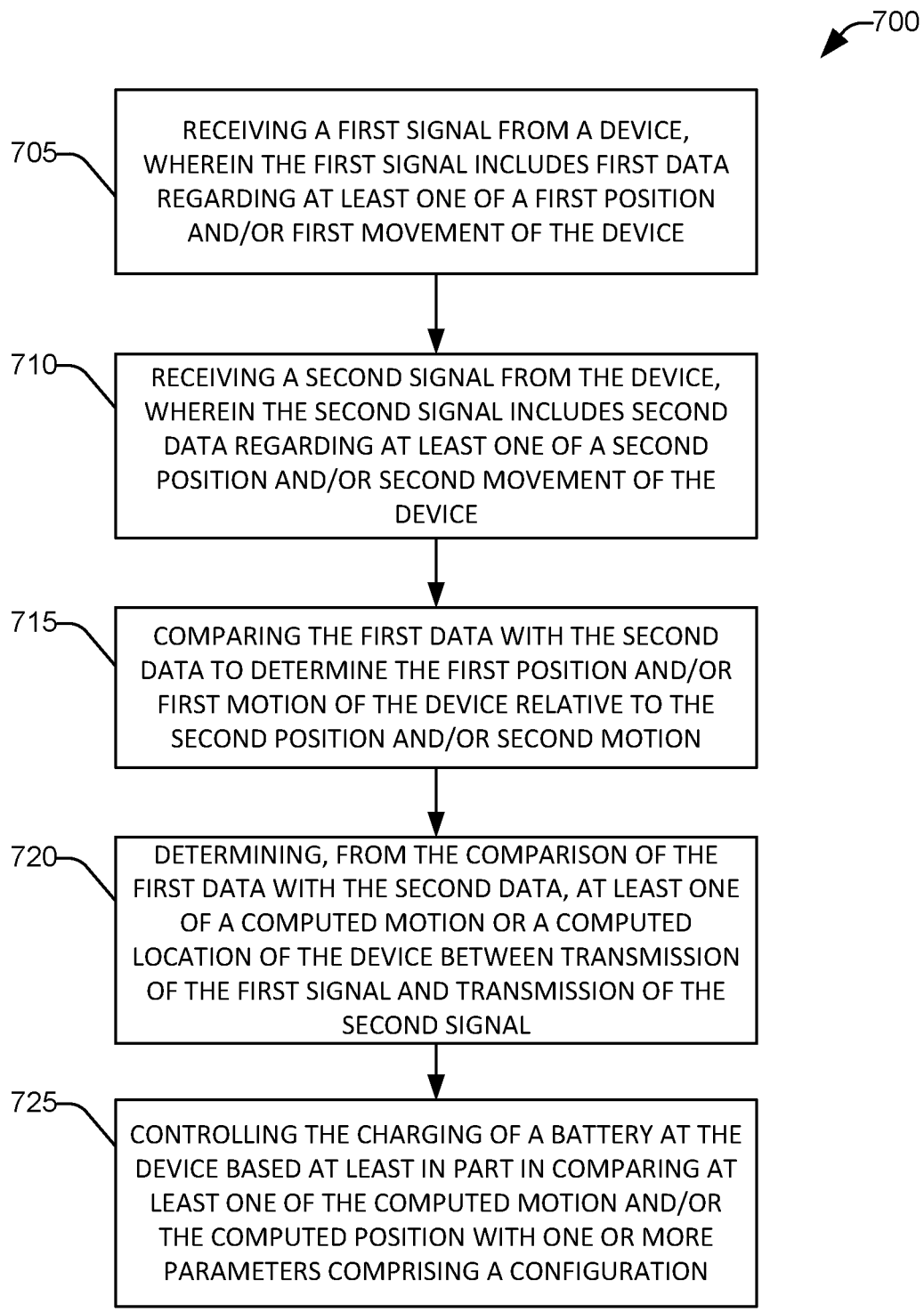
FIG. 7 is a flow diagram showing example operations related to determining a location/motion of a portable device to control a battery charging operation, in accordance with various aspects and implementations of the subject disclosure.

FIG. 7 illustrates a flow diagram for a computer-implemented methodology 700 for controlling a charging operation of a battery (e.g., battery 107) located on an EV (e.g., EV 105) based upon determining location and/or motion of a device (e.g., portable device 125) proximate to the EV.

At 705, the computer-implemented method 700 can comprise receiving (e.g., by transceiver 171 and antenna 172) a first signal (e.g., signal 135A) transmitted from the device (e.g., portable device 125), wherein the first signal includes first data (e.g., data 136A) regarding at least one of a first motion and/or a first position of the device.

At 710, the computer-implemented method 700 can comprise further receiving (e.g., by transceiver 171 and antenna 172) a second signal (e.g., signal 135B) transmitted from the device (e.g., portable device 125), wherein the second signal includes second data (e.g., data 136B) regarding at least one of a second motion and/or a second position of the device.

At 715, the computer-implemented method 700 can further comprise comparing the first data (e.g., data 136A) with the second data (e.g., data 136B) to determine the first position and/or first motion of the device relative to the second position and/or second motion. As previously described, any suitable approach can be utilized to determine respective motions and positions of the device. In an example embodiment, a ToF operation can be utilized (e.g., by location component 175) whereby a first time-of-flight of the first signal being transmitted and received by the EV (e.g., via transceiver 171 and antenna 172) via transmission to the device (e.g., via antenna 129) can be determined. And a second time-of-flight of the second signal being transmitted and received by the EV (e.g., via transceiver 171 and antenna 172) via transmission to the device (e.g., via antenna 129) can be determined. In an alternative embodiment (e.g., a non-ToF operation), the portable device can be aware of its own position (e.g., by cellphone tower triangulation), with the first data and second data being any of position, location, motion, time, etc., being generated and transmitted by one or more components included in the portable device for detection and processing by one or more components located on the EV.

At 720, the computer-implemented method 700 can further comprise determining a position and/or location of the device. In an embodiment, by comparing the first time-of-flight of the first signal (e.g., signal 135A) and the second time-of-flight of the second signal (e.g., signal 135B), it is possible to determine any of a computed location/position and/or computed motion of the device. For example, if the first time-of-flight has a duration longer than the second time-of-flight (e.g., time data 136A>time data 136B), a determination can be made that the device is being conveyed towards the EV as it took less time for the second signal to arrive (return) at the EV than the first signal. In another example, if the first time-of-flight has a duration shorter than the second time-of-flight (e.g., time data 136A<time data 136B), a determination can be made that the device is being conveyed away from the EV as it is took less time for the first signal to arrive (return) at the EV than the second signal. In a further example, if the first time-of-flight has a duration equivalent, or nearly equivalent, to the second time-of-flight (e.g., time data 136A time data 136B), a determination can be made that the device is stationary as the first time-of-flight and second time-of-flight are effectively the same and the device did not move a significant distance between the time the first signal was transmitted and the second signal was transmitted.

In another example, by knowing the time-of-flight for a signal to be transmitted from the device over a given distance, it is possible to determine how far away the device is to a receiver (e.g., transceiver 171). Accordingly, it is possible to determine whether the device is within a particular range of the EV, which enables a determination of whether the device is inside or outside of a defined distance (e.g., detection zone 140) from the receiver (e.g., transceiver 171).

At 725, the computer-implemented method 700 can further comprise controlling the charging of a battery (e.g., battery 107) at the device (e.g., portable device 125) based at least in part in comparing at least one of the computed motion and/or the computed position with one or more parameters included in one or more configurations (e.g., configurations 192A-n). As previously described (e.g., FIGS. 1, 4, 6), one or more configurations (e.g., configurations 192A-n) can be created, wherein the one or more configurations comprise parameters (e.g., parameters 420A-n) including "motion", "position/location", "trajectory of motion", "size of detection zone", "time in detection zone", "inside/outside detection zone", "time of day", "action", etc. With reference to FIG. 4, various scenarios are presented in which the determined position, motion, distance of the device (e.g., portable device 125) relative to the EV (e.g., distance of the device to transceiver 171) is compared with respective configurations (e.g., configurations 192A-n) and the respective parameter settings (e.g., parameters 420A-n). Further, the respective configurations can also have an "action" parameter which indicates an activity to be undertaken when the parameters of the configuration are met, for example, charging of the battery on the EV is ceased, or is maintained. Hence, when the respective parameters of the respective configuration are satisfied/met, the action defined for the respective configuration is enacted. Thus, in an embodiment, (and as previously described herein) where the computed location/position and/or computed motion of the device satisfy the various parameter settings configured for a particular configuration, the defined "action" can be undertaken: "action"='cease charging', 'continue charging', etc. (e.g., by charge control component 180 transmitting an action to the BMS 108 for BMS 108 to operate in accordance with).

Figure 8:
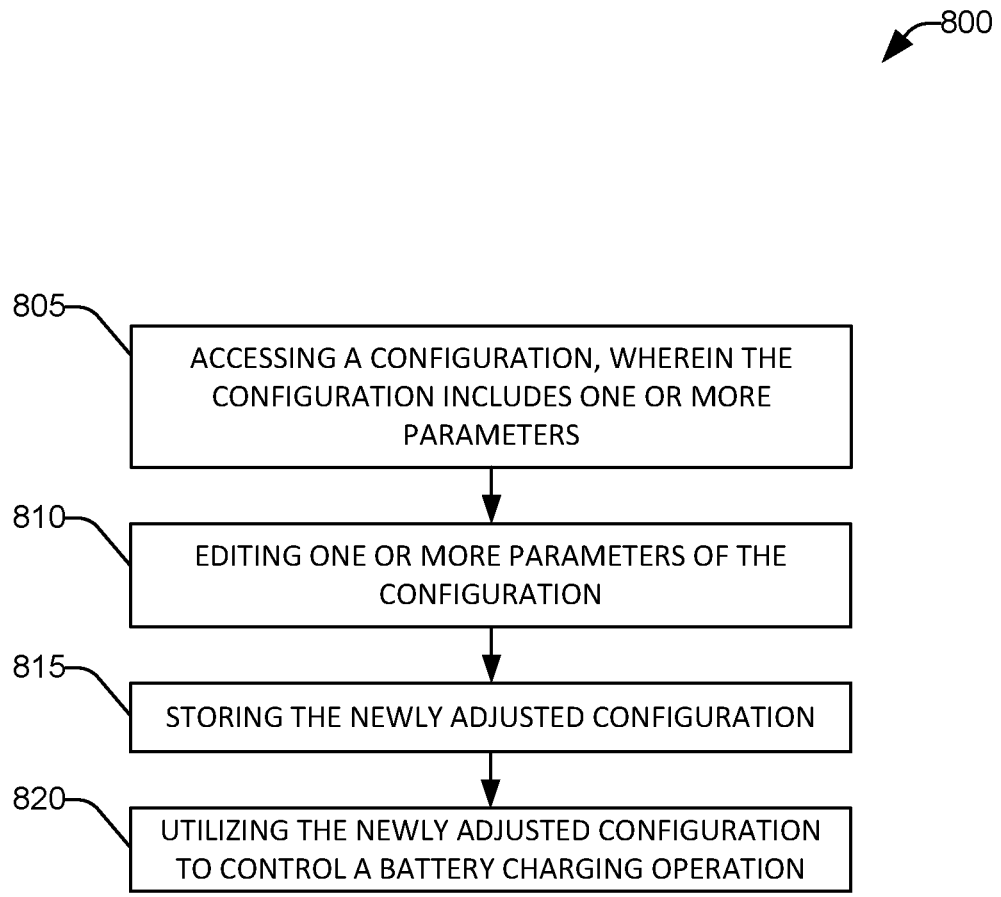
FIG. 8 is a flow diagram showing example operations related to utilizing configurations and parameters for a battery charging operation, in accordance with various aspects and implementations of the subject disclosure.

FIG. 8 illustrates a flow diagram for a computer-implemented methodology 800 for adjusting parameters in a configuration for controlling a charging operation of a battery (e.g., battery 107) located on an EV (e.g., EV 105) based upon determining location and/or motion of a device (e.g., portable device 125) proximate to the EV.

At 805, the computer-implemented method 800 can comprise accessing a configuration (e.g., any of configurations 192A-n) stored in a memory (e.g., memory 164) accessible by a processor (e.g., processor 162), wherein the configuration includes one or more parameters (e.g., parameters 420A-n), and the configuration and associated parameters can be utilized in controlling the charging operation of the battery (e.g., battery 107). In an embodiment, the configuration can be pre-set, e.g., factory-set by the manufacturer, and an operator (e.g., operator 120) of the EV wants to amend the configuration to suit their particular needs regarding a battery charging operation to be performed based upon the determined location and or motion of the portable device (e.g., portable device 125).

At 810, the computer-implemented method 800 can further comprise editing one or more of the parameters (e.g., parameters 420A-n) included in the configuration (e.g., any of configurations 192A-n). Editing (adjusting, configuring) of the one or more parameters enables the configuration to be amended based upon, for example, conditions in which the battery charging operation occurs, e.g., to accommodate the shape of a building interior (e.g., inside of a garage) in which the respective battery charging operations occur. As well as setting a particular parameter, e.g., a zone of detection for the device (e.g., "size of detection zone" of detection zone 140), an "action" can be set to be undertaken when the respective parameters comprising the configuration being edited are met during detecting the mobile device relative to the EV, e.g., terminate charging, maintain charging, re-initiate charging, etc. Editing of one or more of the respective parameters creates a new version of the configuration. As previously described, editing of one or more configurations can be performed via a HMI (e.g., HMI 410) or via a software application (e.g., software application 126) operating on the device.

At 815, the computer-implemented method 800 can further comprise storing (e.g., in memory 164) the newly adjusted configuration (e.g., an edited version of any of configurations 192A-n), wherein the newly adjusted configuration can be saved and replace/overwrite the previous version of the configuration or saved as a new configuration to be added to the existing saved configurations.

At 820, the computer-implemented method 800 can further comprise utilizing the newly adjusted configuration (e.g., an edited version of any of configurations 192A-n), wherein the newly adjusted configuration can be retrieved (e.g., via the HMI 410 or the software application 126) and implemented for use in controlling a charging operation of a battery (e.g., battery 107) located on an EV (e.g., EV 105) based upon determining location and/or motion of a device (e.g., portable device 125) in accordance with the various embodiments presented herein.

Figure 9:
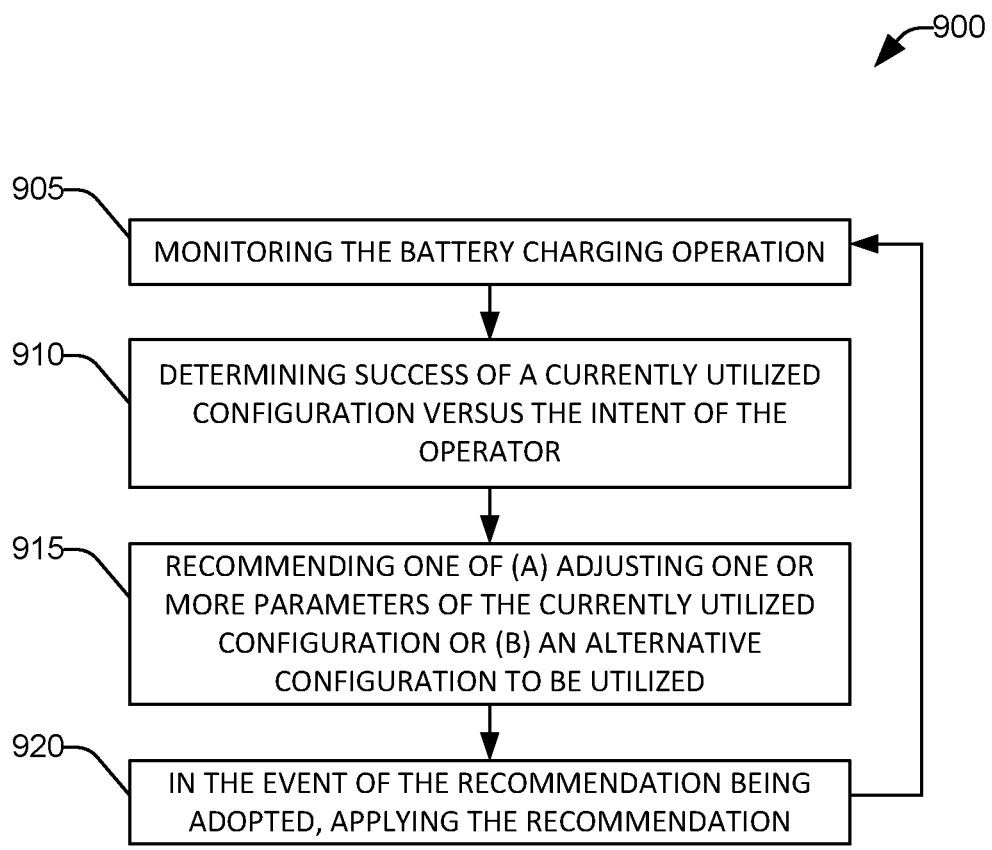
FIG. 9 is a flow diagram showing example operations related to monitoring a battery charging operation, in accordance with various aspects and implementations of the subject disclosure.

FIG. 9 illustrates a flow diagram for a computer-implemented methodology 900 for improving the success of a battery charging operation being performed correctly.

At 900, the computer-implemented method 900 can comprise monitoring the respective battery charging operations (e.g., terminate charging, maintain charging, initiate charging) of a battery (e.g., battery 107) located on an EV (e.g., EV 105) based upon interpretation of position, motion, etc., of a device (e.g., portable device 125) by an operator (e.g., operator 120), versus the intent of the operator regarding the battery charging operation to be performed. Monitoring can be based upon identifying a subsequent action undertaken by the operator after an action has been automatically performed by the various systems presented herein. For example, the computer system (computer system 160) determines based upon location/motion of the device that the operator intends for the current battery charging operation to cease. However, the operator was merely walking by the EV with no intent for the battery charging operation to cease, accordingly, the operator re-initiates the battery charging operation (e.g., by selecting the operation with charging button 490). In an alternative embodiment, the operator can provide direct feedback regarding the computing system correctly determining the intent of the operator regarding the charging operation, e.g., feedback can be provided via a HMI (e.g., via respective action buttons 495 and 496 presented on HMI 410). The change in charging status (e.g., per charging button 490 selection) and/or feedback (per action buttons 495 and 496) can be tallied (e.g., in tally data 498) for further review.

At 910, the success of the computing system can be determined (e.g., by AI component 197) based upon the tally (e.g., tally data 498) versus a threshold value. For example, the threshold is set to 100% but the tally is only at 78% correctness. Accordingly, the AI component determines that operation of the computing system can be improved.

At 915, the AI component (e.g., AI component 197) recommends one of one or more parameters (any of parameters 420A-n) be adjusted for a given configuration (e.g., any of configurations 192A-n) to improve the success of that configuration, or another configuration be selected that may have greater likelihood of success. In an embodiment, the proposed parameter adjustment(s) or new configuration(s) can be presented to the operator (e.g., operator 120) via the HMI 410, so as (a) enable selection and (b) allow the operator to understand the changes being recommended by the AI component.

At 920, in response to the operator (e.g., operator 120) selecting (a) adjustment of a currently used configuration (e.g., any of configurations 192A-n) or (b) an alternative configuration (e.g., any of configurations 192A-n) being selected for utilization by the computing system (e.g., computer system 160), the selection can be applied to the computer system. The flow of methodology 900 can return to 905 for further monitoring of the battery charging operation with the newly applied parameter settings or configuration, and the success based thereon.

Figure 10:
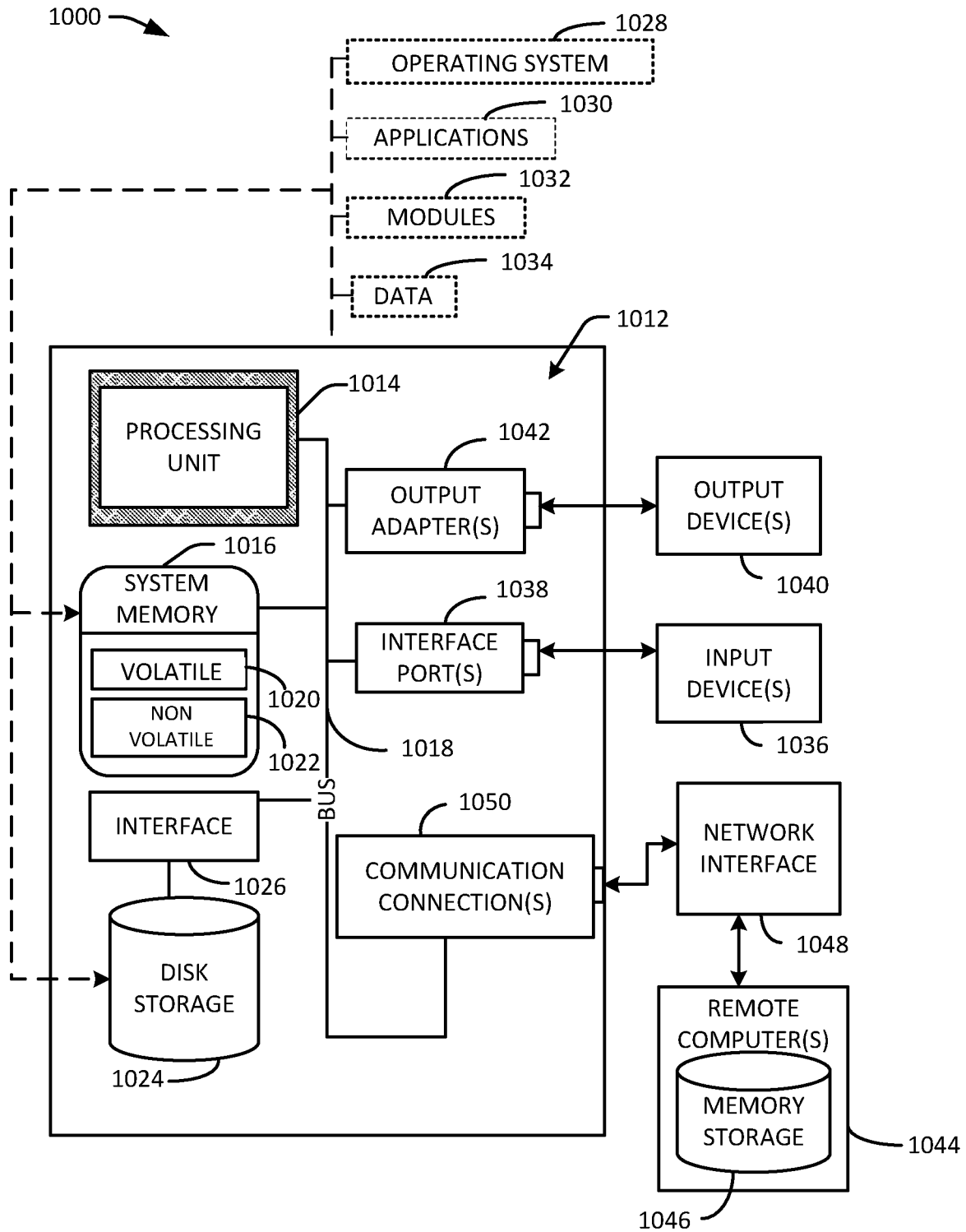
FIG. 10 depicts an example schematic block diagram of a computing environment with which the disclosed subject matter can interact/be implemented at least in part, in accordance with various aspects and implementations of the subject disclosure.
Figure 11:
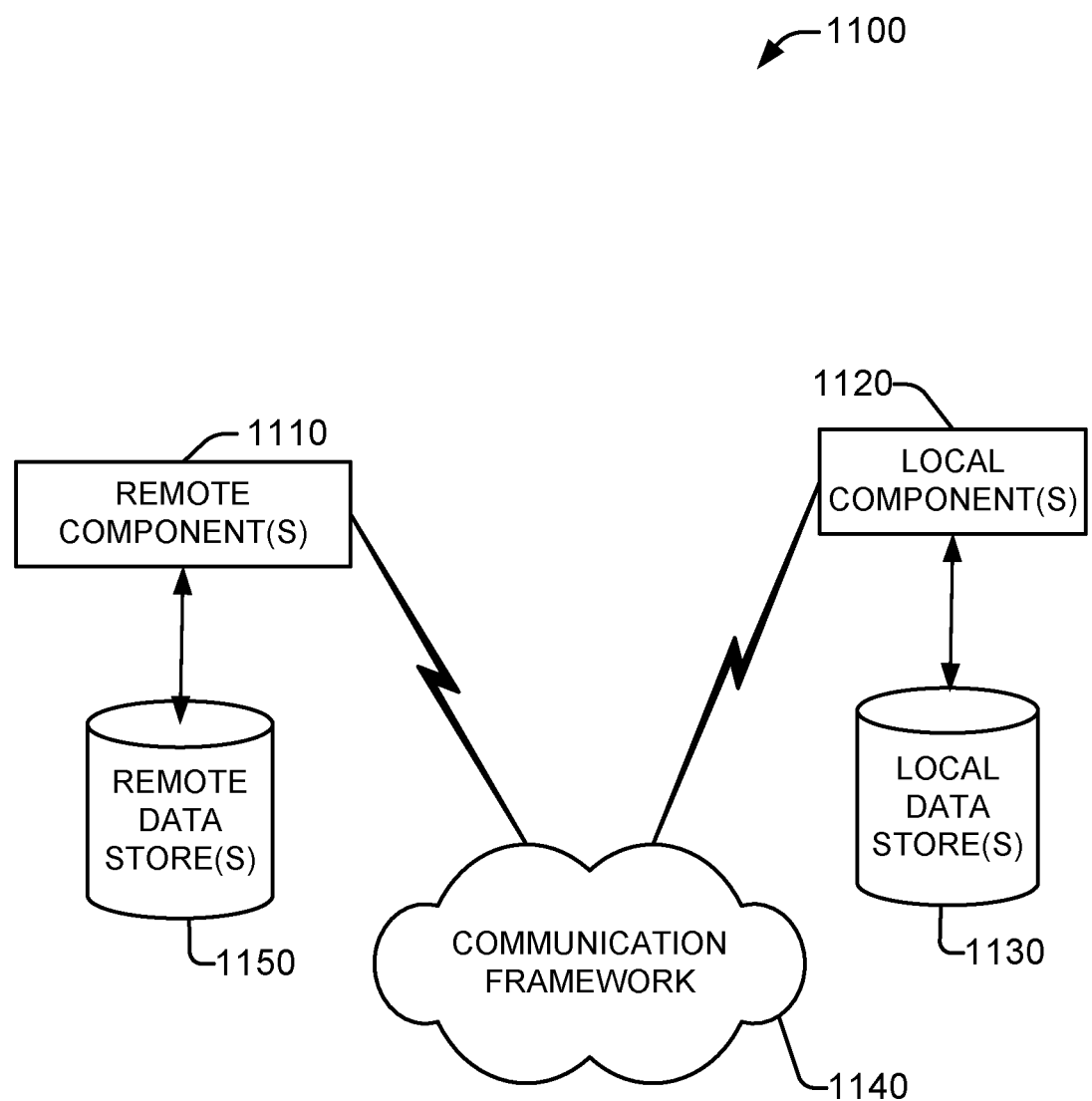
FIG. 11 is a block diagram representing an example computing environment into which aspects of the subject matter described herein may be incorporated.

Turning next to FIGS. 10 and 11, a detailed description is provided of additional context for the one or more embodiments described herein with FIGS. 1-9.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for example purposes only, internal and external technologies such as, modems including regular telephone grade modems, cable modems and DSL modems, ISDN adapters, and Ethernet cards.

The illustrated embodiments described herein can be employed relative to distributed computing environments (e.g., cloud computing environments), such as described below with respect to FIG. 11, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1102 described below with reference to illustration 1100 of FIG. 11. For instance, one or more embodiments described herein and/or components thereof can employ such one or more resources to execute one or more: mathematical function, calculation and/or equation; computing and/or processing script; algorithm; model (e.g., artificial intelligence (AI) model, machine learning (ML) model, deep learning (DL) model, and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed. That is, the one or more embodiments described herein can be implemented in a local environment only, and/or a non-cloud-integrated distributed environment, for example.

A cloud computing environment can provide one or more of low coupling, modularity and/or semantic interoperability. At the heart of cloud computing is an infrastructure that includes a network of interconnected aspects.

Moreover, the non-limiting systems 100-400 can be associated with and/or be included in cloud-based and/or partially-cloud-based system.

Referring now to details of one or more elements illustrated at FIG. 11, an illustrative cloud computing environment 1100 is depicted. FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device, and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures, and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes", "has", "possesses", and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

1. A system, comprising: a memory that stores computer executable components; and a processor that executes the computer executable components stored in the memory, wherein the computer executable components comprise: a signaling component located on an electric vehicle and configured to detect presence of a portable device; and a charge control component configured to, upon detection of the presence of the portable device, terminate charging of the electric vehicle.
2. The system of clause 1, further comprising a transceiver communicatively coupled to the signaling component, the transceiver configured to receive one or more signals transmitted from the portable device.
3. The system of claim any preceding clause wherein the one or more signals received from the portable device are transmitted at ultra-wideband frequency.
4. The system of any preceding clause, wherein the portable device is one of a smartphone, a smartwatch, a computer, a cellphone, or a keyfob.
5. The system of any preceding clause, further comprising a location component configured to determine location of the portable device based upon the one or more signals received at the transceiver, wherein the location component compares first data included in a first signal received by the signaling component and second data included in a second signal received by the signaling component with a plurality of configurations respectively configured to terminate charging of the electric vehicle, maintain charging of the electric vehicle, or initiate charging of the electric vehicle.
6. The system of any preceding clause, wherein the first data and second data comprise at least one of position data or motion data.
7. The system of any preceding clause, the location component further configured, in event of the first data and second data is comparable to a configuration to terminate charging of the electric vehicle, to transmit a signal to the charge control component to terminate charging of the electric vehicle.
8. The system of any preceding clause, the location component further configured, in event of the first data and second data is not comparable to a configuration to terminate charging of the electric vehicle, to transmit a signal to the charge control component to maintain charging of the electric vehicle.
9. A computer-implemented method for controlling charging of an electric vehicle comprising: detecting at least one of movement or location of a portable device proximate to the electric vehicle; and terminating charging of a battery located on the electric vehicle based upon on the movement or location of the portable device.
10. The computer-implemented method of clause 9, further comprising: receiving a first signal and a second signal from the portable device; and establishing a pattern of movement or location of the portable device by comparing first data in the first signal with second data in the second signal.
11. The computer-implemented method of any preceding clause, further comprising: determining charging of the electric vehicle is to be terminated based upon the pattern of movement or location of the portable device.
12. The computer-implemented method of any preceding clause, wherein the determining the pattern of movement or location further comprises comparing the pattern with a plurality of pre-configured patterns.
13. The computer-implemented method of any preceding clause, further comprising adjusting at least one pattern in the plurality of pre-configured patterns based upon local operating conditions.
14. The computer-implemented method of any preceding clause, wherein the first signal and second signal are transmitted at ultra-wideband frequency.
15. The computer-implemented method of any preceding clause, wherein the portable device is a keyfob, a smartphone, a smartwatch, a cellphone, or a computer, configured to transmit signals using ultra-wideband frequency.
16. A computer program product comprising a computer readable storage medium having program instructions embodied therewith, the program instructions executable by a processor to cause the processor to: terminate charging of an electric vehicle based upon on the movement or location of a portable device relative to a location of the electric vehicle.
17. The computer program product of clause 16, wherein the program instructions are further executable by the processor to cause the processor to: determine the movement or location of the portable device based upon a plurality of signals received from the portable device.
18. The computer program product of any preceding clause, wherein the program instructions are further executable by the processor to cause the processor to: determining, based upon the movement or location of the portable device, charging of the electric vehicle is to be maintained.

19. The computer program product of any preceding clause, wherein the plurality of signals received from the portable device are ultra-wideband frequency.

20. The computer program product of any preceding clause, wherein the portable device is one of a smartphone, a smartwatch, a computer, a cellphone, a personal digital assistant, a tablet computer, or a keyfob.

What is claimed is:

1. An electric vehicle, comprising:
a memory that stores computer executable components; and
a processor that executes at least one of the computer executable components that:
in response to determining that the electric vehicle is being charged:
detects, using a transceiver of the electric vehicle, presence of a portable device based on signals received from the portable device;
determines position information of the portable device, wherein the position information comprises location data and motion data; and
terminate the charging of the electric vehicle in response to a determination that the position information meets defined criteria, wherein the defined criteria comprises:
the location data indicating that the portable device has entered a defined zone around a charging port of the electric vehicle, and
the motion data indicating that the portable device has a trajectory directed to the charging port.

2. The electric vehicle of claim 1, wherein the position information further comprises velocity data, and the defined criteria further comprises:
the velocity data indicating that a velocity of movement of the portable device is decreasing.

3. The electric vehicle of claim 1, wherein the signals received from the portable device are transmitted at ultra-wideband frequency.

4. The electric vehicle of claim 1, wherein the portable device is one of a smartphone, a smartwatch, a computer, a cellphone, or a keyfob.

5. The electric vehicle of claim 1, wherein the defined criteria further comprises:
the location data indicating that the portable device has previously left the defined zone for at least a defined amount of time before the entering of the defined zone.

6. The electric vehicle of claim 1, wherein the defined criteria further comprises:
the position data indicating the portable device is stationary in the defined zone for a defined amount of time.

7. The electric vehicle of claim 1, further comprising:
in response to the determination that the position information meets defined criteria, unlock, from the charging port, a cable employed for to charge the electric vehicle.

8. A computer-implemented method for controlling charging of an electric vehicle comprising:
in response to determining that the electric vehicle is being charged, detecting, by the electric vehicle using a transceiver, presence of a portable device based on signals received from the portable device;
determining, by the electric vehicle, position information of the portable device, wherein the position information comprises location data and motion data; and
terminating the charging of a battery located on the electric vehicle in response to a determination that the position information meets defined criteria, wherein the defined criteria comprises:
the location data indicating that the portable device has entered a defined zone around a charging port of the electric vehicle, and
the motion data indicating that the portable device has a trajectory directed to the charging port.

9. The computer-implemented method of claim 8, wherein the position information further comprises velocity data, and the defined criteria further comprises:
the velocity data indicating that a velocity of movement of the portable device is decreasing.

10. The computer-implemented method of claim 8, wherein the defined criteria further comprises:
the location data indicating that the portable device has previously left the defined zone for at least a defined amount of time before the entering of the defined zone.

11. The computer-implemented method of claim 8, wherein the defined criteria further comprises:
the position data indicating the portable device is stationary in the defined zone for a defined amount of time.

12. The computer-implemented method of claim 8, further comprising:
in response to the determination that the position information meets defined criteria, unlocking, by the electric vehicle, from the charging port, a cable employed to charge the electric vehicle.

13. The computer-implemented method of claim 8, wherein the second signals received from the portable device are transmitted at ultra-wideband frequency.

14. The computer-implemented method of claim 8, wherein the portable device is a keyfob, a smartphone, a smartwatch, a cellphone, or a computer.

15. A computer program product comprising a computer readable storage medium having program instructions embodied therewith, the program instructions executable by a processor of an electric vehicle to cause the processor to:
in response to determining that the electric vehicle is being charged:
detect, using a transceiver of the electric vehicle, presence of a portable device based on signals received from the portable device;
determine position information of the portable device, wherein the position information comprises location data and motion data; and
terminate the charging of the electric vehicle in response to a determination that the position information meets defined criteria, wherein the defined criteria comprises:
the location data indicating that the portable device has entered a defined zone around a charging port of the electric vehicle, and
the motion data indicating that the portable device has a trajectory directed to the charging port.

16. The computer program product of claim 15, wherein the position information further comprises velocity data, and the defined criteria further comprises:
the velocity data indicating that a velocity of movement of the portable device is decreasing.

17. The computer program product of claim 15, wherein the defined criteria further comprises:
the location data indicating that the portable device has previously left the defined zone for at least a defined amount of time before the entering of the defined zone.

18. The computer program product of claim 15, wherein the of signals received from the portable device are ultra-wideband frequency.

19. The computer program product of claim 15, wherein the portable device is one of a smartphone, a smartwatch, a computer, a cellphone, a personal digital assistant, a tablet computer, or a keyfob.

20. The computer program product of claim 15, wherein the defined criteria further comprises:
   the position data indicating the portable device is stationary in the defined zone for a defined amount of time.

\* \* \* \* \*